(12) United States Patent
Iwai et al.

(10) Patent No.: US 9,820,110 B2
(45) Date of Patent: Nov. 14, 2017

(54) COMMON SERVICE DEVICE, DISTRIBUTION DEVICE, COMMUNICATION NETWORK, DISTRIBUTION METHOD, AND NON-TRANSITORY COMPUTER READABLE MEDIUM

(71) Applicant: NEC CORPORATION, Tokyo (JP)

(72) Inventors: Takanori Iwai, Tokyo (JP); Tetsuo Inoue, Tokyo (JP); Norio Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/023,708

(22) PCT Filed: Jul. 8, 2014

(86) PCT No.: PCT/JP2014/003617
§ 371 (c)(1),
(2) Date: Mar. 22, 2016

(87) PCT Pub. No.: WO2015/045232
PCT Pub. Date: Apr. 2, 2015

(65) Prior Publication Data
US 2016/0234656 A1    Aug. 11, 2016

(30) Foreign Application Priority Data

Sep. 27, 2013    (JP) ................................. 2013-202774

(51) Int. Cl.
*H04M 11/04*    (2006.01)
*H04W 4/06*    (2009.01)
(Continued)

(52) U.S. Cl.
CPC ............. *H04W 4/06* (2013.01); *H04L 12/189* (2013.01); *H04L 63/08* (2013.01); *H04W 12/06* (2013.01);
(Continued)

(58) Field of Classification Search
CPC ....... H04W 4/06; H04W 12/06; H04W 4/046; H04W 4/22; H04W 88/18; H04L 63/08; H04L 12/189
See application file for complete search history.

(56) References Cited

U.S. PATENT DOCUMENTS 8,548,419 B1 * 10/2013 Sennett ................... H04W 4/22
455/404.1
2004/0228294 A1 * 11/2004 Kim ...................... H04W 72/02
370/312
(Continued)

FOREIGN PATENT DOCUMENTS

JP    2004-274185 A    9/2004
JP    2008-172750 A    7/2008
(Continued)

OTHER PUBLICATIONS

International Search Report for PCT/JP2014/003617 dated Aug. 12, 2014.

*Primary Examiner* — Ajit Patel
(74) *Attorney, Agent, or Firm* — Sughrue Mion, PLLC

(57) ABSTRACT

An object of the invention is to provide a common service device cable of broadcast distribution of various types of messages. A common service device (20) according to the present invention aggregates a plurality of application servers (40) and is connected to a plurality of distribution networks (30). The common service device (20) includes: an authentication unit (21) that performs authentication for a first application server by using a distribution request message transmitted from a first application server included in (Continued)

the plurality of application servers (40) via a first interface commonly set among the plurality of application servers (40); and a communication unit (22) that selects a first distribution network for which broadcast distribution is requested from among the plurality of distribution networks (30) based on the distribution request message, and transmits a broadcast distribution request message to the selected first distribution network.

15 Claims, 25 Drawing Sheets

(51) Int. Cl.
*H04W 12/06* (2009.01)
*H04L 12/18* (2006.01)
*H04L 29/06* (2006.01)
*H04W 88/18* (2009.01)
*H04W 4/22* (2009.01)
*H04W 4/04* (2009.01)

(52) U.S. Cl.
CPC .............. *H04W 4/046* (2013.01); *H04W 4/22* (2013.01); *H04W 88/18* (2013.01)

(56) References Cited

U.S. PATENT DOCUMENTS

| | | | |
|---|---|---|---|
| 2006/0261012 A1* | 11/2006 | Wang | C09C 3/046 210/695 |
| 2007/0077922 A1* | 4/2007 | Kim | H04H 20/57 455/414.2 |
| 2007/0174467 A1 | 7/2007 | Ballou, Jr. et al. | |
| 2008/0039010 A1 | 2/2008 | Vance et al. | |
| 2011/0070861 A1* | 3/2011 | Daly | H04L 67/02 455/404.1 |
| 2011/0176473 A1* | 7/2011 | Schliwa-Bertling | H04W 76/007 370/312 |
| 2011/0212700 A1* | 9/2011 | Petite | H04W 4/12 455/404.1 |
| 2013/0155954 A1* | 6/2013 | Wang | H04W 4/005 370/328 |
| 2013/0157610 A1* | 6/2013 | Vainik | G06F 11/0781 455/404.1 |
| 2014/0016628 A1* | 1/2014 | McCann | H04W 4/001 370/338 |
| 2014/0050137 A1* | 2/2014 | Alberth, Jr. | H04W 4/22 370/312 |

FOREIGN PATENT DOCUMENTS

| | | |
|---|---|---|
| JP | 2008-538473 A | 10/2008 |
| JP | 2010-45747 A | 2/2010 |

\* cited by examiner

| Child Resource Name | Child Resource Type | Multiplicity | Description |
|---|---|---|---|
| <deviceTriggering> | <deviceTriggering> | 0..1 | <deviceTriggering> resource is used for triggering specific device(s) by M2M applications via appropriate underlying networks. Refer to 9.5.y+1 for more detail. |
| <deviceCharactorist ic> | <deviceCharactori stic> | 0..n | <deviceCharactoristic> resource is used for sharing device characteristics of specific devices between M2M applications and underlying networks. Refer to 9.5.y+2 for more detail. |
| <areaService> | <areaService> | 0..n | <areaService> resource is used for accessing service based on specific geographical area from M2M applications to underlying networks. Refer to 9.5.y+3 for more detail. |
| <groupService> | <groupService> | 0..n | <groupService> resource is used for accessing service based on specific group of M2M devices from M2M applications to underlying networks. Refer to 9.5.y+4 for more detail. |
| <subscription> | <subscription> | 0..n | <subscription> resource is used to subscribe for notifying updation of current level of resource to be subscribed by any of AE or CSE. In <serviceExposure> resource, <subscription> resource shall be used for notifying announcement of newly added exposed service by underlying networks to M2M applications. |

Fig. 4

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RW | This attribute is the target identifier of a specific device or a specific group of devices. For example, an external identifier or an external group identifier is used for 3GPP devices. |
| mobilityCharacteristic | 0..1 | RW | This attribute is a device characteristic for mobility. Three types are utilized as stopping, low mobility, and high mobility. |
| mobilityArea | 0..1 | RW | This attribute is a device characteristic for geographical area of mobility. |
| mobilityDestination | 0..1 | RW | This attribute is a device characteristic for the destination of mobility. |
| averageBandwidthusage | 0..1 | RW | This attribute is a device characteristic for the average bandwidth of usage. |
| averageTimecommunication | 0..1 | RW | This attribute is a device characteristic for the average time of communication (or manipulation). |

Fig. 5

| Attribute Name | Multiplicity | RW/RO/WO | Description |
|---|---|---|---|
| averageIntervalcommunications | 0..1 | RW | This attribute is a device characteristic for the average interval between communications. |
| averageDelaytime | 0..1 | RW | This attribute is a device characteristic for the average delay time. |
| scheduleCommunications | 0..1 | RW | This attribute is a device characteristic for the schedule of communications. |
| powercomsumptionRemained | 0..1 | RW | This attribute is a device characteristic for the remainded power with percentage. |
| powercomsumptionMode | 0..1 | RW | This attribute is a device characteristic for the mode of power comsumption. Two modes are available as powerSaving and powerCharging. |
| radiosignalInformation | 0..1 | RW | This attribute is a device characteristic for the reception status information of the radio signal. |
| bootedApplications | 0..n | RW | This attribute is a device characteristic for information of the booted applications on the device. |

Fig. 6

| Attribute Name | Description |
|---|---|
| expirationTime | XRef <section> where the common attribute is described. |
| accessRightID | XRef <section> where the common attribute is described. |
| creationTime | XRef <section> where the common attribute is described. |
| lastModifiedTime | XRef <section> where the common attribute is described. |
| Message Body | a datum to be sent to M2M Devices. A string is expected in many cases, but any other format may be specified. |
| Geographic Area | a set of values to specify a geographic area in which the Underlying Network broadcasts/multicasts the data.<br>e.g. a circle (center, radius), ellipse (two focuses, long radius, short radius), rectangle (four points), polygon (multiple points), belt (center, width, length) with latitudes and longitudes, or Area ID pre-shared between the hosting CSE and the ASE. |
| Duration Parameters | a set of values to specify how many times, how long the Underlying Network repeats broadcasting/multicasting the data. Since broadcasting/multicasting is usually one-way communication, it should be repeated a few times.<br>e.g. the number of times, interval, delay tolerance, expiration timer, and misc. |

Fig. 7

| Attribute Name | Description |
|---|---|
| Method | a value/string to specify which mechanism/technology is to be used in the Underlying Network to broadcast/multicast the data.<br>e.g. CBS, MBMS, or any others |
| Radio Bearer | a value/string to specify which radio bearer is to be used in the Underlying Network to broadcast/multicast the data.<br>e.g. UMTS, GMS, etc. |
| NSE | a list of NSEs which the hosting CSE should request to broadcast/multicast the data. |
| Message Category | This attribute is a device characteristic for the remainded power with percentage. |
| powercomsumptionMode | a hinting value to specify which kind of content is stored in the Message Body.<br>e.g. 1: Disaster, 2: Security, 3: Medical affairs, 4: Transportation, 5: Energy, 6: Weather, 7: Advertising |
| Acknowledgement | a binary flag (TRUE of FALSE) to specify if the M2M Device have to acknowledge the received data. |
| Device Action | a value to specify the action of M2M Devices when they received the Message Body.<br>e.g. Beep, pop-up a message, etc. |

Fig. 8

| Child Resource Name | Child Resource Type | Multiplicity | Description |
|---|---|---|---|
| <triggerResult> | <triggerResult> | 0..1 | <triggerResult> resource is used to store the result of device triggering in the underlying network. If the originator AE subscribes on the <subscription> resource in advance, the notification shall be delivered to the AE when the <triggerResult> resource is updated. |
| <subscription> | <subscription> | 0..1 | <subscription> resource is used to subscribe for notifying updation of current level of resource to be subscribed by any of AE or CSE. In <deviceTriggering> resource, <subscription> resource shall be used for notifying the triggering result to M2M applications. |

Fig. 9

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RW | This attribute is the target identifier of a specific device. For example, an external identifier or a MSISDN is used for 3GPP devices. |
| triggerPayload | 1 | RW | This attribute contains the triggering payload to be delivered to the specified target identifier. This is type of octed string. |
| priorityIndication | 0..1 | RW | This attribute is used to indicate priority of device triggering. Either of Non-priority or Priority can be indicated. |
| applicationPortIdentifier | 0..1 | RW | This attribute is used to specify the triggering application addressed in the target device. Refer to 3GPP Tsp protocol specification (ref.[i+1]) for more detail. |
| validityTime | 0..1 | RW | This attribute is used to specify a validity time in seconds for waiting of device triggering transaction. Refer to 3GPP Tsp protocol specification (ref.[i+1]) for more detail. |

Fig. 10

| Attribute Name | Multiplicity | RW/RO/WO | Description |
|---|---|---|---|
| expirationTime | 1 | RW | XRef <section> where the common attribute is described. |
| accessRightID | 1..n | RO | XRef <section> where the common attribute is described. |
| creationTime | 1 | RW | XRef <section> where the common attribute is described. |
| lastModifiedTime | 1 | RO | XRef <section> where the common attribute is described. |
| targetIdentifier | 1 | RO | This attribute is the target identifier of a specific device for the original request. For example, the external identifier or the MSISDN is used for 3GPP devices. |
| requestStatus | 0..1 | RO | This attribute is used to specify the result of device triggering in case the triggering action could not be performed in 3GPP network by some reason. Refer to 3GPP Tsp protocol specification (ref.[i+1]) for more detail. |
| deliverlyOutcome | 0..1 | RO | This attribute is used to specify the result of device triggering in case the triggering action could be performed in 3GPP network but it was failure by some reason. Refer to 3GPP Tsp protocol specification (ref.[i+1]) for more detail. |

Fig. 11

COMMON SERVICE DEVICE, DISTRIBUTION DEVICE, COMMUNICATION NETWORK, DISTRIBUTION METHOD, AND NON-TRANSITORY COMPUTER READABLE MEDIUM

CROSS REFERENCE TO RELATED APPLICATIONS

This application is a National Stage of International Application No. PCT/JP2014/003617 filed Jul. 8, 2014, claiming priority based on Japanese Patent Application No. 2013-202774 filed Sep. 27, 2013, the contents of all of which are incorporated herein by reference in their entirety.

TECHNICAL FIELD

The present invention relates to a common service device, and more particularly, to a common service device used for, for example, broadcast distribution.

BACKGROUND ART

In the case of distributing data to a plurality of communication devices, a data distributor distributes data using a broadcast distribution service provided in a network managed by a carrier. To achieve the broadcast distribution, techniques such as a broadcast service and a multicast service are used. In mobile communication networks, CBS (Cell Broadcast Service) is used to distribute emergency information. CBS is a service that gives a notification about information by broadcasting to mobile phone terminals within a target area. Further, ETWS (Earthquake and Tsunami Warning System) is provided to meet the need for high-speed disaster notification and a flexible distribution area.

Patent Literature 1 discloses a configuration in which a distribution area is designated in a broader-area unit or a sector unit in the case of designating a distribution area for an emergency message.

CITATION LIST

Patent Literature

[Patent Literature 1] Japanese Unexamined Patent Application Publication No. 2010-45747

SUMMARY OF INVENTION

Technical Problem

Patent Literature 1 discloses a network configuration in which a message distribution station which has received a data distribution request from a flash report transmission station transmits an emergency distribution message. However, it is expected in the future that communication networks will broadcast and distribute not only messages related to emergency information, but also various other types of messages. Thus, it is necessary to construct communication networks which will be able to broadcast and distribute distribution messages with different contents for each application server so that various types of messages can be broadcasted and distributed. In this regard, Patent Literature 1 discloses a network configuration capable of executing the distribution of messages requested by a specific flash report transmission station. However, Patent Literature 1 does not disclose any network configuration capable of distributing various types of messages requested by a plurality of different carriers and the like. Thus, Patent Literature 1 has a problem that it is impossible to broadcast and distribute distribution messages with different contents for each application server.

To solve the above-mentioned problem, an object of the present invention is to provide a common service device, a distribution device, a communication network, a distribution method, and a program which are capable of broadcasting and distributing various types of messages.

Solution to Problem

A common service device according to a first exemplary aspect of the present invention is a common service device that is located in a service platform connected to a plurality of distribution networks and aggregates a plurality of application servers, the common service device including: an authentication unit that performs authentication for a first application server by using a distribution request message transmitted from the first application server via a first interface commonly set among the plurality of application servers, the first application server being included in the plurality of application servers; and a communication unit that selects a first distribution network for which broadcast distribution is requested from among the plurality of distribution networks based on the distribution request message, and transmits a broadcast distribution request message to the selected first distribution network.

A distribution device according to a second exemplary aspect of the present invention is a distribution device that is located in a distribution network, the distribution device including: a communication unit that acquires a broadcast distribution request message generated based on a distribution request message from a common service device that has received the distribution request message transmitted from an application server, and distributes information to a plurality of communication terminals based on a distribution policy included in the broadcast distribution request message.

A communication system according to a third exemplary aspect of the present invention is a communication system including: a common service device that aggregates a plurality of application servers; and a distribution device connected to the common service device. The common service device is located in a service platform and includes: an authentication unit that performs authentication for a first application server by using a distribution request message transmitted from the first application server via a first interface commonly set among the plurality of application servers, the first application server being included in the plurality of application servers; and a communication unit that selects a first distribution network for which broadcast distribution is requested from among the plurality of distribution networks based on the distribution request message, and transmits a broadcast distribution request message to the selected first distribution network. The distribution device is located in the first distribution network and includes a communication unit that acquires the broadcast distribution request message and distributes information to a plurality of communication terminals based on a distribution policy included in the broadcast distribution request message.

A distribution method according to a fourth exemplary aspect of the present invention is a distribution method for a common service device that is located in a service platform connected to a plurality of distribution networks and aggregates a plurality of application servers, the distribution method including: executing authentication processing for a first application server by using a distribution request message transmitted from the first application server via a first interface commonly set among the plurality of application servers, the first application server being included in the plurality of application servers; selecting a first distribution network for which broadcast distribution is requested from among the plurality of distribution networks based on the distribution request message; and transmitting a broadcast distribution request message to the selected first distribution network.

A program according to a fifth exemplary aspect of the present invention is a program for causing a computer of a common service device to execute processing, the common service device being located in a service platform connected to a plurality of distribution networks and being configured to aggregate a plurality of application servers, the processing including the steps of: executing authentication processing for a first application server by using a distribution request message transmitted from the first application server via a first interface commonly set among the plurality of application servers, the first application server being included in the plurality of application servers; selecting a first distribution network for which broadcast distribution is requested from among the plurality of distribution networks based on the distribution request message; and transmitting a broadcast distribution request message to the selected first distribution network.

Advantageous Effects of Invention

According to the present invention, it is possible to provide a common service device, a distribution device, a communication network, a distribution method, and a program which are capable of broadcasting and distributing various types of messages.

BRIEF DESCRIPTION OF DRAWINGS

FIG. 4 is a table showing child resources of a serviceExposure resource according to the second exemplary embodiment;

FIG. 5 is a table showing attributes of a deviceCharactoristic resource according to the second exemplary embodiment;

FIG. 6 is a table showing attributes of the deviceCharactoristic resource according to the second exemplary embodiment;

FIG. 7 is a table showing attributes of an areaService resource or a groupService resource according to the second exemplary embodiment;

FIG. 8 is a table showing attributes of the areaService resource or the groupService resource according to the second exemplary embodiment;

FIG. 9 is a table showing child resources of a deviceTriggering resource according to the second exemplary embodiment;

FIG. 10 is a table showing attributes of the deviceTriggering resource according to the second exemplary embodiment;

FIG. 11 is a table showing attributes of a triggerResult resource according to the second exemplary embodiment;

DESCRIPTION OF EMBODIMENTS

First Exemplary Embodiment

Figure 1:
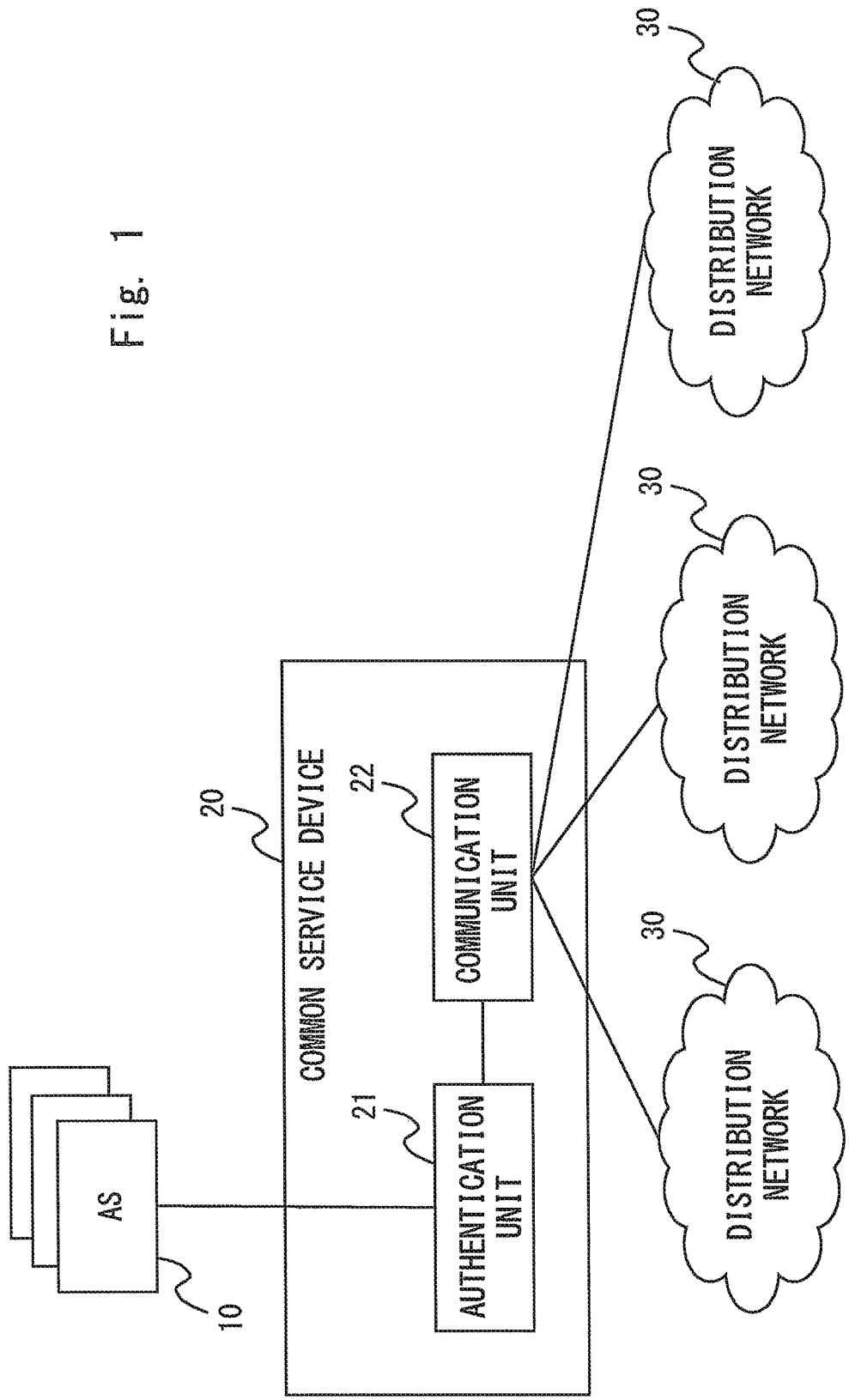
FIG. 1 is a block diagram showing a communication system according to a first exemplary embodiment.

Exemplary embodiments of the present invention will be described below with reference to the drawings. A configuration example of a communication system according to a first exemplary embodiment of the present invention will be described with reference to FIG. 1. The communication system shown in FIG. 1 includes a plurality of application servers (ASs) 10, a common service device 20, and a plurality of distribution networks 30. The common service device 20 includes an authentication unit 21 and a communication unit 22.

The application server 10 is a server device managed by a service provider or the like that generates information to be distributed through the distribution networks 30. The application server 10 transmits, for example, distribution information, as well as a distribution policy which defines a distribution area, the number of distributions, or the like, to the common service device 20.

In this case, the common service device 20 and the application server 10 are connected via an interface that is commonly set between the common service device 20 and the plurality of application servers 10. In other words, the specifications of the interface set between the common service device 20 and the application servers 10 are the same as the specifications of the interface set between the common service device 20 and other application servers. Thus, even when there are a plurality of service providers that provide different services, the plurality of application servers 10 can be connected to the common service device 20 by setting the common interface specifications between the common service device 20 and the plurality of application servers 10.

Each distribution network 30 is a network that broadcasts and distributes information to the communication terminals and the like that are connected to the respective networks. The broadcast distribution may be, for example, broadcast communication or multicast communication. In mobile communication networks, the CBS (Cell Broadcast Service) for distributing emergency information may be used as means for broadcast distribution. Further, in a network constructed based on the specifications specified in the 3GPP, the MBMS (Multimedia broadcast Multicast Service) may be used.

Each distribution network 30 may be a mobile communication network, or a fixed communication network used for a fixed telephone or the like. The distribution network 30 may be a network managed by an Internet service provider, a network that constructs a Wireless LAN, or the like.

The plurality of distribution networks 30 may be, for example, networks of the same type, such as mobile communication networks, or networks of different types, such as a combination of mobile communication networks and fixed communication networks.

Next, a configuration example of the common service device 20 will be described. The authentication unit 21 of the common service device 20 receives a distribution request message transmitted from each application server 10 via the interface which is set between the authentication unit 21 and the application servers 10. Further, the authentication unit 21 uses the received distribution request message to perform authentication for the application server 10 which has transmitted the distribution request message.

For example, when an identifier associated with the application server 10 which has transmitted the distribution request message is set, the authentication unit 21 may determine whether the identifier associated with the application server 10 indicates the application server that is permitted to be connected in advance. For example, the authentication unit 21 may hold information about a list of application servers that are permitted to be connected in advance.

When the connection of the application server 10 is not permitted as a result of the authentication processing, the authentication unit 21 may send a notification indicating that the connection to the application server 10 is not permitted, or may release the connection with the application server 10. When the connection of the application server 10 is permitted as a result of the authentication processing, the authentication unit 21 may output, to the communication unit 22, a notification indicating that the connection of the application server 10 is permitted.

When the connection of the application server 10 is permitted by the authentication unit 21, the communication unit 22 selects the distribution network 30 for which the execution of broadcast distribution is requested from among the plurality of distribution networks 30. Further, the communication unit 22 transmits a broadcast distribution request message to the selected distribution network 30.

Figure 2:
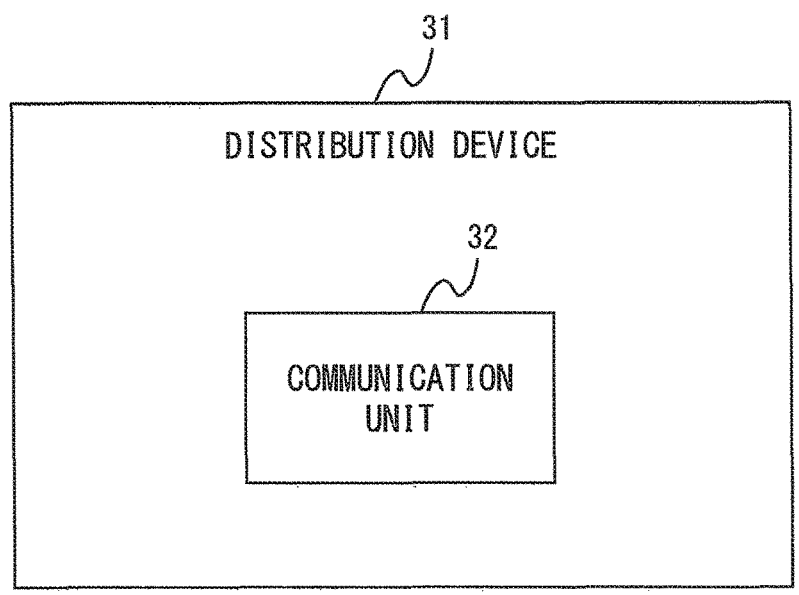
FIG. 2 is a block diagram showing a distribution device according to the first exemplary embodiment.

Next, a configuration example of a distribution device 31 which is located in each distribution network 30 according to the first exemplary embodiment of the present invention will be described with reference to FIG. 2. The distribution device 31 includes a communication unit 32. The communication unit 32 receives the broadcast distribution request message transmitted from the common service device 20. Further, the communication unit 32 broadcasts and distributes information to a plurality of communication terminals based on a distribution policy included in the broadcast distribution request message.

For example, when a distribution area which is determined by the application server 10 is set in the broadcast distribution request message, the communication unit 32 specifies a communication device or the like present in the specified distribution area, and broadcasts and distributes information to the communication terminals via the specified communication device. Further, when the number of distributions which is determined by the application server 10 is set in the broadcast distribution request message, the communication unit 32 executes the broadcast distribution by the specified number of times.

As described above, the use of the communication system according to the first exemplary embodiment of the present invention enables the plurality of application servers 10 to be connected to the communication service device 20 via a predetermined interface. The connection of the common service device 20 to the plurality of application servers 10 enables the common service device 20 to broadcast and distribute information via the distribution networks 30 based on the distribution request messages transmitted from the respective application servers 10.

Second Exemplary Embodiment

Figure 3:
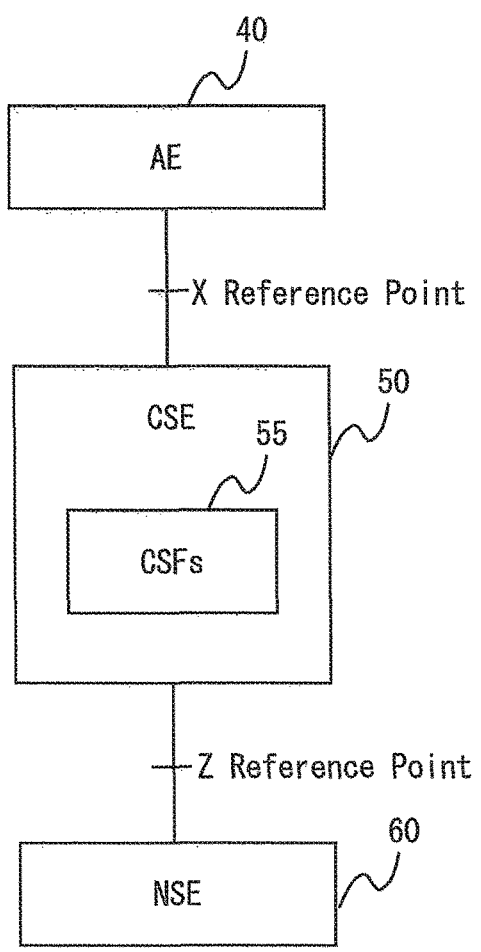
FIG. 3 is a block diagram showing a communication system according to a second exemplary embodiment.

Next, a configuration example of a communication system according to a second exemplary embodiment of the present invention will be described with reference to FIG. 3. The communication system shown in FIG. 3 includes an AE (Application Entity) 40, a CSE (Common Services Entity) 50, and an NSE (Network Service Entity) 60. The AE, the CSE, and the NSE are node devices specified in oneM2M for standardization regarding Machine-to-Machine services. The AE 40 corresponds to each application server 10 shown in FIG. 1. The CSE 50 corresponds to the common service device 20 shown in FIG. 1. The NSE 60 corresponds to the distribution device 31 shown in FIG. 2.

The CSE 50 may be a server device managed by a service provider that intermediates the communication between a plurality of AEs 40 and a plurality of NSEs 60. The CSE 50 or a group of a plurality of CSEs 50 managed by the service provider can also be referred to as a service platform.

An interface between the AE 40 and the CSE 50 is defined as an X Reference Point. An interface between the CSE 50 and the NSE 60 is defined as a Z Reference Point.

The X Reference Point will now be described. The X Reference Point specifies a format exclusive for broadcasting and a common format in which necessary information items are defined, when the distribution request message is transmitted from the AE 40 to the CSE 50.

The AE 40 sets a distribution destination service platform ID and a distribution source application ID in the common format. The distribution destination service platform ID is, for example, an ID allocated to the CSE 50. When the service provider manages a plurality of CSEs 50, a common distribution destination service platform ID may be allocated to the plurality of CSEs 50. The distribution source application ID is an ID that is used to identify the AE 40.

In the format exclusive for broadcasting, information items, such as distribution classification, a message body, distribution area information, a distribution period, a terminal behavior, a priority level, terminal arrival confirmation, a distribution system, a radio system for distribution, or a designated NSE ID, are defined. The AE 40 sets these information items in the format exclusive for broadcasting. The information items are described below.

The distribution classification refers to, for example, information indicating the content of information to be distributed. Examples of the distribution classification may include disaster information, security information, medical information, traffic information, electric power information, weather information, and advertisement information. For example, when IDs, such as ID:1 for disaster information and ID:2 for security information, are allocated in advance, the AE 40 may assign the IDs as the distribution classification.

In the message body, for example, character information, numerical information, or symbolic information to be displayed on the communication terminal of the distribution destination is set. For example, sentence information, which is a combination of character information, numerical information, symbolic information, and the like, may be set in the message body. The combination of information items set in the message body is not limited to this combination. For example, a combination of character information and numerical information, a combination of numerical information and symbolic information, or a combination of character information and symbolic information may be used. Alternatively, only one of the character information, the numerical information, and the symbolic information may be set in the message body.

Available characters, symbols, numerical values, and the like may be defined in the message body. The number of characters and the like that can be set may also be defined in the message body.

The distribution area information refers to information about the distribution area in which the AE 40 wishes to distribute information. For example, when the distribution area is composed of a plurality of areas, an area ID may be allocated to each area. In this case, the area ID of the area in which the AE 40 wishes to distribute information is set in the distribution area information. Alternatively, when coordinates are set in the entire distribution area, the coordinates set in the area in which the AE 40 wishes to distribute information are set in the distribution area information. The distribution area information may indicate that the distribution area is within a circle with a radius of A km (A is a value equal to or greater than 0) centered at certain coordinates, or that the extension of the distribution area may be represented not only by a circle, but also by an ellipse, a square, a polygon, or the like. Address information or the like may be designated as the distribution area, or information about a location, such as a location along a specific highway, may be designated as the distribution area. The distribution area information may also be indicated by GPS information.

As the distribution period, the number of distributions of information via the distribution network 30, time intervals at which information is distributed, or the like may be defined. Alternatively, a distribution time, an allowable delay time, or the like may be defined as the distribution period. An effective period for the distribution request message transmitted from the AE 40, or the like may also be defined as the distribution period.

As the terminal behavior, an operation in the communication terminal which has received information via the distribution network 30 may be set. For example, an operation in the communication terminal which has received information may be set in such a manner that the communication terminal is caused to output a buzzer sound, a melody, or the like. Alternatively, an operation in the communication terminal which has received information may be set in such a manner that the communication terminal is caused to display a pop-up screen or the like, which indicates that the information has been received, on a display screen of the communication terminal. In this manner, the setting of the terminal behavior upon reception of information enables a user who holds the communication terminal to be notified of the reception of the information.

As for the priority level, the priority of distribution information items which the AE 40 wishes to distribute is determined. For example, "High", "Normal", and "Low" may be set in a descending order of priority as priority levels. Also, "Emergency" may be set as a priority level higher than "High". The AE 40 may determine the distribution request message every time the AE 40 transmits the distribution request message. Alternatively, the priority level may be automatically determined by being associated with the distribution classification. For example, when disaster information is set in the distribution classification, the priority level may be automatically determined to be "Emergency", and when advertisement information is set in the distribution classification, the priority level may be automatically determined to be "Low".

When a large number of distribution request messages are transmitted simultaneously from the plurality of AE 40, the CSE 50 may sequentially process the distribution request messages in a descending order of priority. Alternatively, the CSE 50 may notify the NSE 60 of the information about the priority level, and the NSE 60 may preferentially distribute the information with a priority level of, for example, "Emergency" or "High".

As the distribution system, for example, the broadcast distribution system used in the NSE 60 may be set. For example, broadcast distribution systems specified in the 3GPP, such as CBS and MBMS, may be designated as the distribution system.

As the radio system for distribution, for example, the radio system used for the communication terminal to connect to the distribution network 30 may be set. For example, radio systems specified in the 3GPP, such as 3G and LTE, may be designated as the radio system for distribution.

As the target NSE ID, an ID for identifying the NSE that performs information distribution is set. The CSE 50 is connected with a plurality of NSEs 60 which are respectively located in different distribution networks 30. Accordingly, when the NSE 60 to be selected by the CSE 50 is designated in advance, the AE 40 may set the target NSE ID.

It is not necessary for the AE 40 to set all the information items described above. The information items described above may be divided into two groups, i.e., essential items that are required to be set and optional items that can be optionally set. For example, the essential items may include the distribution classification, the message body, the distribution area information, the distribution period, and the terminal behavior, and the optional items may include the priority level, the distribution system, the radio system for distribution, and the designated NSE ID.

Next, the configuration and functions of the CSE 50 will be described. The CSE 50 includes CSFs (Common Service Functions) 55 as functional blocks. The CSFs 55 may be configured using, for example, a CPU or the like in the CSE 50. The CSFs 55 correspond to the authentication unit 21 and the communication unit 22 shown in FIG. 1. The functions to be implemented in the CSFs 55 will be described below.

The CSFs 55 receive the distribution request message transmitted from the AE 40 via the X Reference Point. The CSFs 55 have a function to check the items set in the received distribution request message.

For example, the CSFs 55 determine whether the distribution source application ID corresponds to the AE which is permitted to be connected to the CSE 50 in advance. For example, the CSFs 55 may hold information about a list of the AEs that are permitted to be connected to the CSE 50 in advance. The CSFs 55 may determine whether the distribution source application ID set in the distribution request message is included in the list of the AEs that are permitted to be connected to the CSE 50 in advance.

Further, the CSFs 55 may check the validity for other information items of the distribution request message. For example, assume that the AE 40 is permitted to set only advertisement information or weather information as the distribution classification. The distribution classification which can be set by the AE 40 may be specified in, for example, a contract between the carrier that manages the AE 40 and the carrier that manages the CSE 50. Further, the CSFs 55 may hold information about the contract between the carriers. In this case, if traffic information is set in the distribution request message transmitted from the AE 40, the CSFs 55 may determine the distribution request message transmitted from the AE 40 to be an invalid message and may discard the distribution request message. The CSFs 55 may check items other than the distribution classification, and may also check the validity of the distribution request message.

After the checking of the distribution request message is completed, the CSFs 55 select the NSE 60 to which the broadcast distribution request message is to be transmitted from among the plurality of NSEs 60. The CSFs 55 select the NSE 60 by using the information items set in the distribution request message.

For example, if the NSEs 60 have different distribution areas in which the NSEs 60 can perform the distribution, the CSFs 55 may select the NSE 60 which can distribute information to the distribution area designated in the distribution request message. If the NSEs 60 have different distribution systems, the CSFs 55 may select the NSE 60 which supports the distribution system designated in the distribution request message. If the NSEs 60 have different radio systems for distribution, the CSFs 55 may select the NSE 60 which supports the radio system for distribution designated in the distribution request message.

On the other hand, when the NSE ID is designated in the distribution request message, the CSFs 55 select the NSE 60 that is associated with the designated NSE ID.

When the NSE 60 is selected, the CSFs 55 convert the distribution request message transmitted from the AE 40 into a format to be used in the selected NSE 60, and generate the broadcast distribution message to be transmitted to the selected NSE 60. The format used in the NSE 60 is defined as the Z Reference Point. The Z Reference Point specifies a format exclusive for broadcasting and a common format in which necessary information items are defined, when the distribution request message is transmitted from the CSE 50 to the NSE 60.

The CSFs 55 set a distribution destination network ID and a distribution source service platform ID in the common format. The distribution destination network ID is, for example, an ID allocated to the NSE 60. The distribution source service platform ID is an ID that is used to identify the CSE 50.

The information items to be set in the format exclusive for broadcasting as defined in the Z Reference Point are basically similar to the information items to be set in the format exclusive for broadcasting as defined in the X Reference Point, and thus detailed descriptions thereof are omitted.

The contents of the items to be set in the format exclusive for broadcasting as defined in the Z Reference Point may be changed based on the contents of the information items to be set in the format exclusive for broadcasting as defined in the X Reference Point.

For example, when the area ID is set as the distribution area information in the format exclusive for broadcasting as defined in the X Reference Point, the CSE 50 may convert the area ID into positional information to be used for the NSE 60 in the format exclusive for broadcasting as defined in the Z Reference Point, and may set the positional information. For example, the NSE 60 may designate a communication device, a base station, or the like to distribute information to a communication terminal. In this case, the CSE 50 may set the ID of the communication device, the base station, or the like, which is located within the designated area ID, as the distribution area information in the Z Reference Point.

Thus, when the contents of the information items to be set in each reference point are different, the CSE 50 may change the information transmitted from the AE 40 into information to be used in the NSE 60. Such a change may be made in the NSE 60.

In the above description, the message transmitted from the AE 40 to the CSE 50 is referred to as the distribution request message, whereas the message transmitted from the CSE 50 to the NSE 60 is referred to as the broadcast distribution message. However, both the messages may be referred to as the distribution request message.

In addition to the above-described functions, the CSFs 55 may perform charge processing. The charge processing may include, for example, generation of charge information when the information distribution is performed using the NSE 60 upon reception of the distribution request message from the AE 40.

Specific examples of the CSFs will be described. The term "CSFs" is a general term for a plurality of functions. One of the plurality of functions is a Network Service Exposure, Service Execution and Triggering (NSE) CSF. The NSE CSF manages the plurality of resources. The plurality of resources are, for example, updated in the AE. When the resources managed by the AE are updated, the NSE CSF notifies the NSE of the updated information via the X Reference Point. The resources managed by the NSE CSF will be described below.

The NSE CSF manages a serviceExposure resource for M2M Applications. The NSE CSF also manages the following resources as child resources of the serviceExposure resource for M2M Applications.

deviceTriggering resource as a child resource of serviceExposure resource deviceCharacteristic resource as a child resource of serviceExposure resource locationNotification resource as a child resource of serviceExposure resource policyRule resource as a child resource of serviceExposure resource locationQuery resource as a child resource of serviceExposure resource imsService resource as a child resource of serviceExposure resource deviceManagement resource as a child resource of serviceExposure resource areaService resource as a child resource of serviceExposure resource groupService resource as a child resource of serviceExposure resource underlyingNetwork resource for the CSE operation purpose collection of underlyingNetwork resources linkManagement resource as a child resource of underlyingNetwork resource linkCredential resource as a child resource of linkManagement resource The information items, such as the distribution classification, the message body, the distribution area information, the distribution period, the terminal behavior, the priority level, the terminal arrival confirmation, the distribution system, the radio system for distribution, or the designated NSE ID, which are set in the format exclusive for broadcasting, are set in any one of the above-mentioned child resources.

In this case, the deviceTriggering resource, the deviceCharacteristic resource, the areaService resource, the groupService resource, and the subscription resource which is not described in the above-mentioned child resources have functions as shown in FIG. 4.

For example, the deviceTriggering resource is a resource to manage the timing when the AE 40 notifies the NSE 60 of the execution of services. The deviceCharacteristic resource is, for example, a resource to manage the characteristics of communication terminals connected to the NSE 60. The areaService resource is a resource to manage the distribution area. The groupService resource is a resource to manage the group of communication terminals to which information is distributed. The subscription resource is a resource used to notify the AE 40 of updated resources when any one of the child resources is updated. The provision of the subscription resource enables bidirectional communication between the AE 40 and the NSE 60.

The deviceCharacteristic resource has attributes as listed in FIGS. 5 and 6. The areaService resource or the groupService resource has attributes as listed in FIGS. 7 and 8. The deviceTriggering resource includes a triggerResult resource as a child resource as shown in FIG. 9. The deviceTriggering resource has attributes as listed in FIG. 10. The triggerResult resource which is a child resource of the deviceTriggering resource has attributes as listed in FIG. 11.

When the AE 40 updates a resource such as the deviceCharacteristic resource, the areaService resource, the groupService resource, the deviceTriggering resource, or the triggerResult resource, which is a child resource of the deviceTriggering resource, the CSE 50 selects the NSE 60 to which information is to be sent. The CSE 50 determines, for example, whether the NSE needs to be notified of information about the updated resource, and selects the NSE 60. Alternatively, the NSE 60 may be selected based on policy information or the like. The CSE 50 notifies the selected NSE 60 of the information about the updated resource.

The CSE 50 is installed in any one of an Application Service Node (ASN), such as a communication terminal, a Middle Node (MN), such as a router, and an Infrastructure Node (IN), such as a service platform. In this case, the interface to be used for communication with the NSE, or the information to be sent to the NSE varies depending on which one of the ASN, the MN, and the IN the CSE 50 is installed in. Accordingly, the CSE 50 may have a function to identify which one of the ASN, the MN, and the IN the CSE 50 is installed in. This function may be implemented by a CPU or the like that executes a program stored in a memory.

A case where the CSE 50 is installed in the IN will now be described. In this case, the CSE 50 may select an interface from among OMA, GSMA OneAPI framework, and the like when the CSE 50 communicates with the NSE. Further, when the child resources included in the serviceExposure resource are updated, the CSE 50 may request the NSE 60 to execute the following functions.

IP Multimedia communications

Messaging

Location

Charging and billing services

Device information and profiles

Configuration and management of devices

Triggering, monitoring of devices

Small data transmission

Group management

For example, when the deviceTriggering resource is updated, the CSE 50 may request the NSE 60 to execute the functions associated with "Triggering" and "Small data transmission". When the deviceCharacteristic resource is updated, the CSE 50 may request the NSE 60 to execute the functions associated with "Device information and profiles". When the locationNotification resource is updated, the CSE 50 may request the NSE 60 to execute the functions associated with "Location". When the policyRule resource is updated, the CSE 50 may request the NSE 60 to execute the functions associated with "Charging and billing services". When the locationQuery resource is updated, the CSE 50 may request the NSE 60 to execute the functions associated with "Location". When the imsService resource is updated, the CSE 50 may request the NSE 60 to execute the functions associated with "IP Multimedia communications". When the deviceManagement resource is updated, the CSE 50 may request the NSE 60 to execute the functions associated with "Configuration and management of devices". When the groupService resource is updated, the CSE 50 may request the NSE 60 to execute the functions associated with "Group management".

Figure 12:
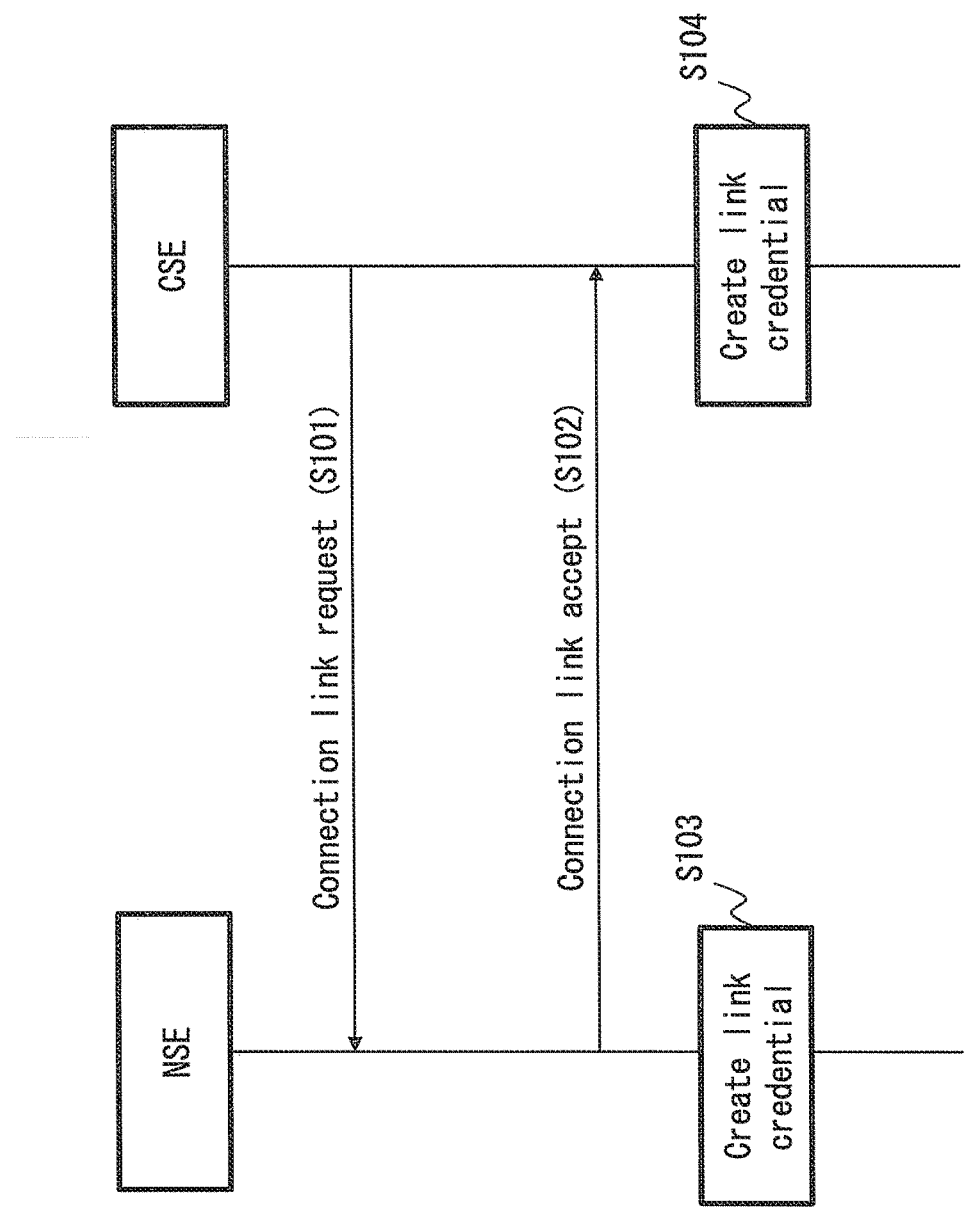
FIG. 12 is a diagram for explaining a link connection procedure at a Z Reference Point according to the second exemplary embodiment.

Next, a link connection procedure at the Z Reference Point will be described with reference to FIG. 12. First, the CSE 50 transmits a Connection link request message to the NSE 60 (S101). Next, the NSE 60 transmits a Connection link accept message as a response message (S102). After the notification of the messages in steps S101 and S102, the NSE 60 and the CSE 50 each execute link setup processing (Create link credential) (S103, S104).

Figure 13:
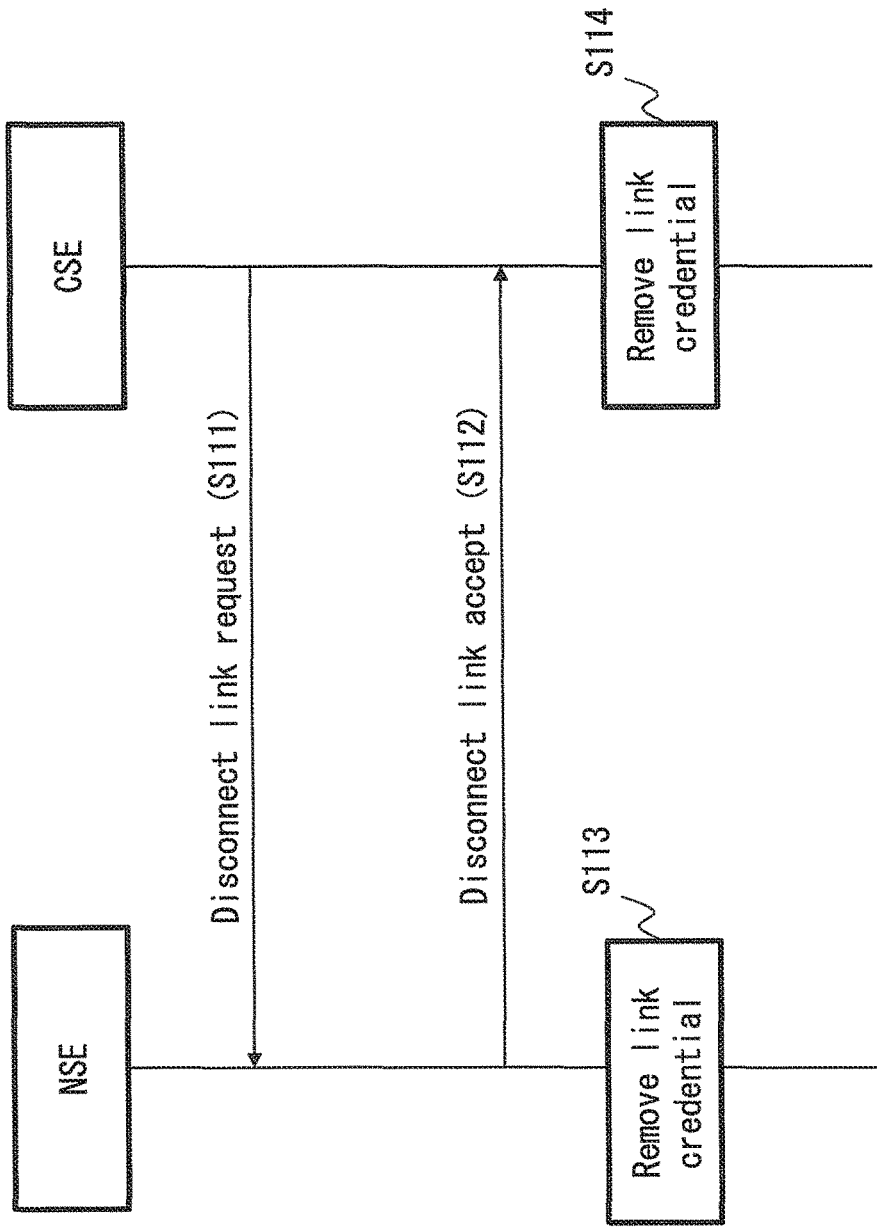
FIG. 13 is a diagram for explaining a link disconnection procedure at the Z Reference Point according to the second exemplary embodiment.

Next, a link disconnection procedure at the Z Reference Point will be described with reference to FIG. 13. First, the CSE 50 transmits a Disconnect link request message to the NSE 60 (S111). Next, the NSE 60 transmits a Disconnect link accept message as a response message (S112). After the notification of the messages in steps S111 and S112, the NSE 60 and the CSE 50 each execute link disconnection processing (Remove link credential) (S113, S114).

Figure 14:
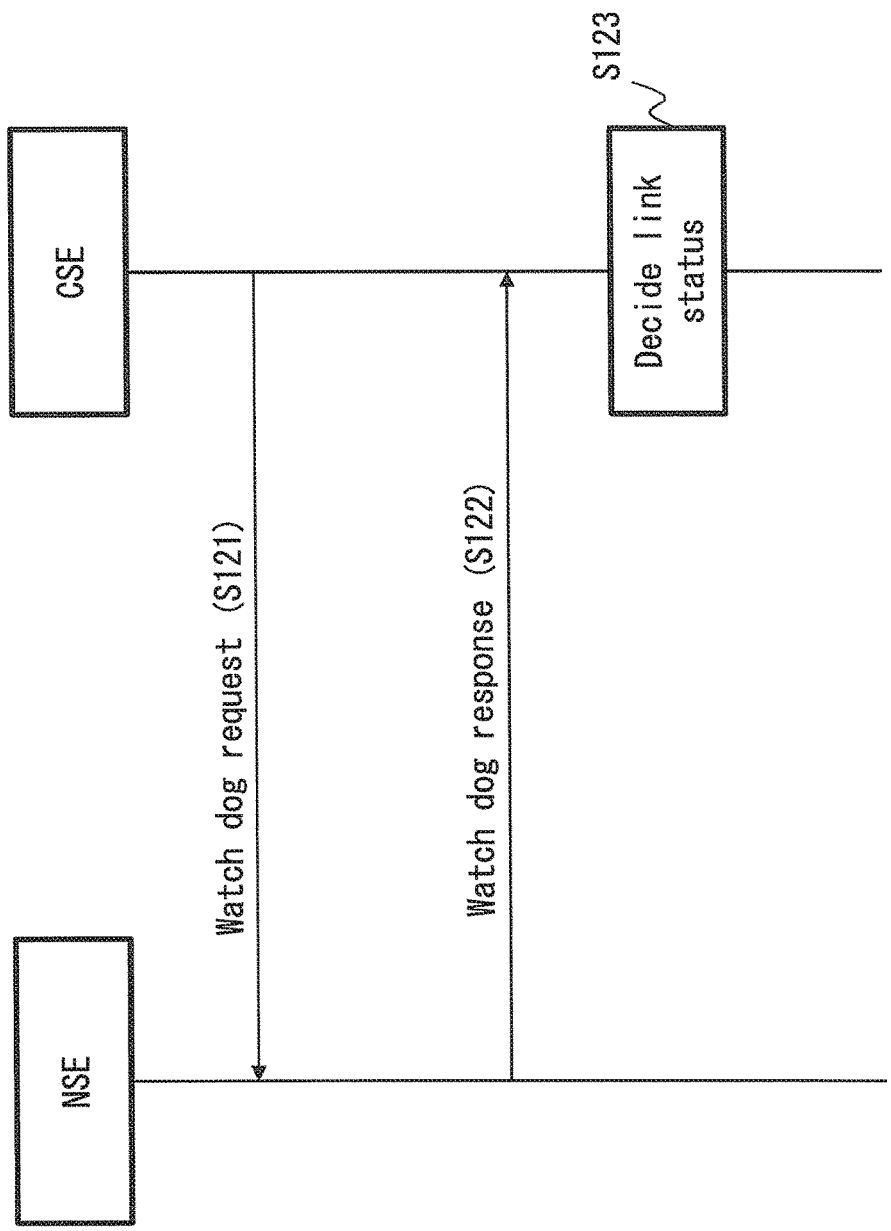
FIG. 14 is a diagram for explaining a link monitoring procedure at the Z Reference Point according to the second exemplary embodiment.

Next, a link monitoring procedure at the Z Reference Point will be described with reference to FIG. 14. First, the CSE 50 transmits a Watch dog request message to the NSE 60 (S121). Next, the NSE 60 transmits a Watch dog response message as a response message (S122). Then, the CSE 50 determines the link state between the CSE 50 and the NSE 60 based on the Watch dog response message (S123).

Figure 15:
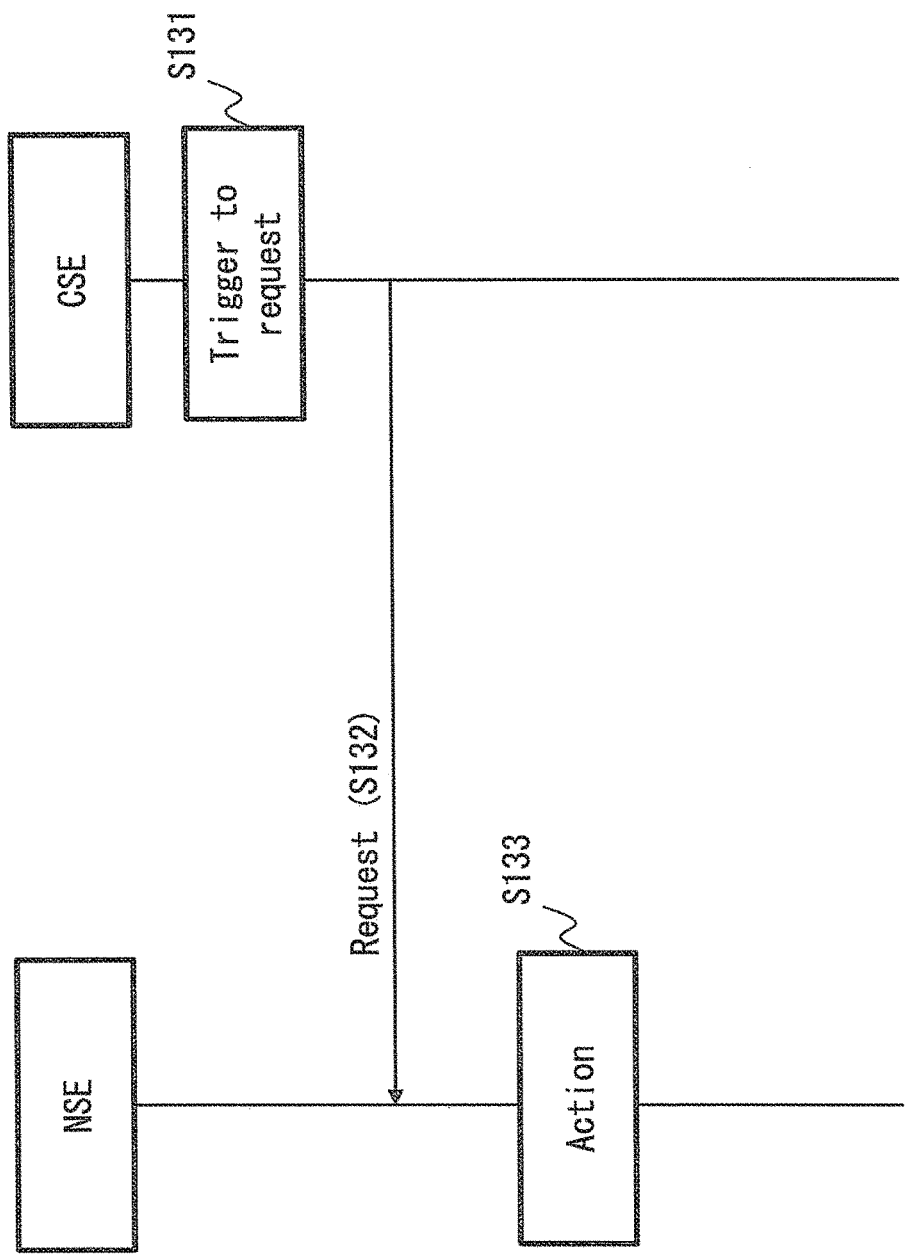
FIG. 15 is a diagram for explaining a service request procedure via the Z Reference Point according to the second exemplary embodiment.

Next, a service request procedure via the Z Reference Point will be described with reference to FIG. 15. First, the CSE 50 determines to transmit a Request message when, for example, a resource is updated (S131). Next, the CSE 50 transmits the Request message to the NSE 60. Then, the NSE 60 executes the indicated service based on the Request message (S133).

Figure 16:
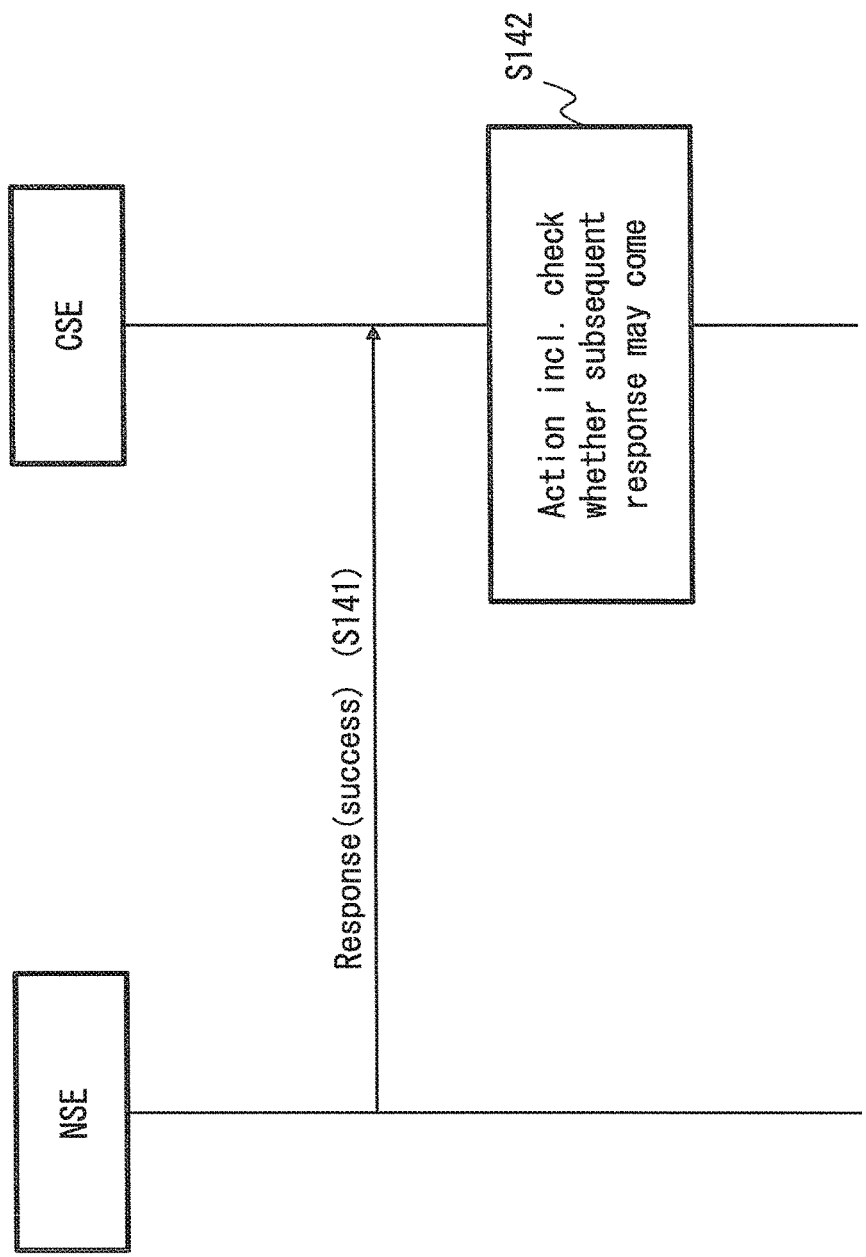
FIG. 16 is a diagram for explaining a processing flow when the execution of a service according to the second exemplary embodiment is successful.

Next, processing to be performed when the execution of the service is successful will be described with reference to FIG. 16. First, the NSE 60 transmits a Response message to the CSE 50 (S141). Information indicating that the execution of the service has been successful is set in the Response message. Next, the CSE 50 determines whether another Response message has been transmitted or not (S142).

Figure 17:
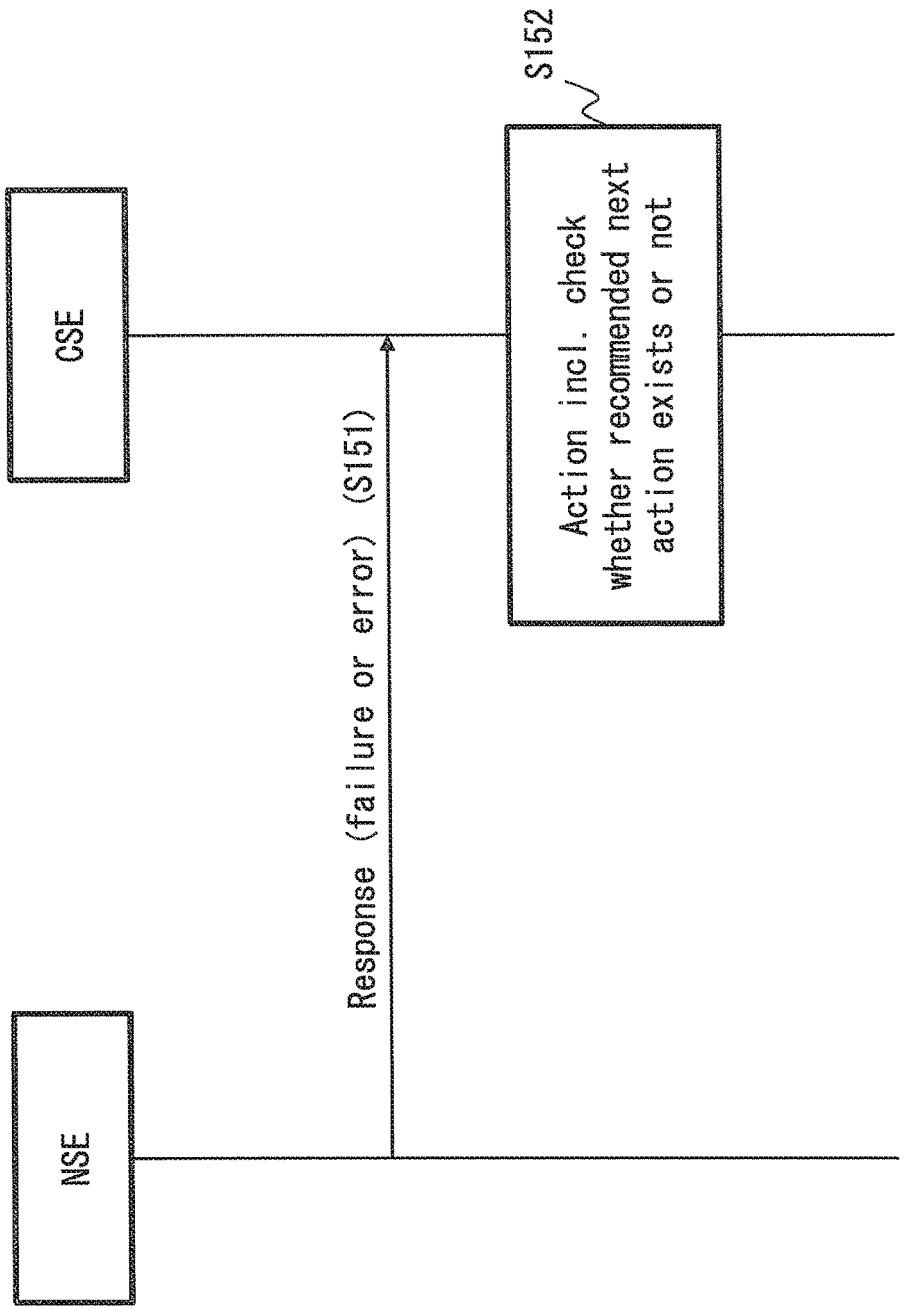
FIG. 17 is a diagram for explaining a processing flow when the execution of the service according to the second exemplary embodiment is not successful.

Next, processing to be performed when the execution of the service is not successful will be described with reference to FIG. 17. First, the NSE 60 transmits a Response message to the CSE 50 (S151). Information indicating that the execution of the service has not been successful is set in the Response message. Next, the CSE 50 determines whether the execution of the next service is indicated or not (S152).

Figure 18:
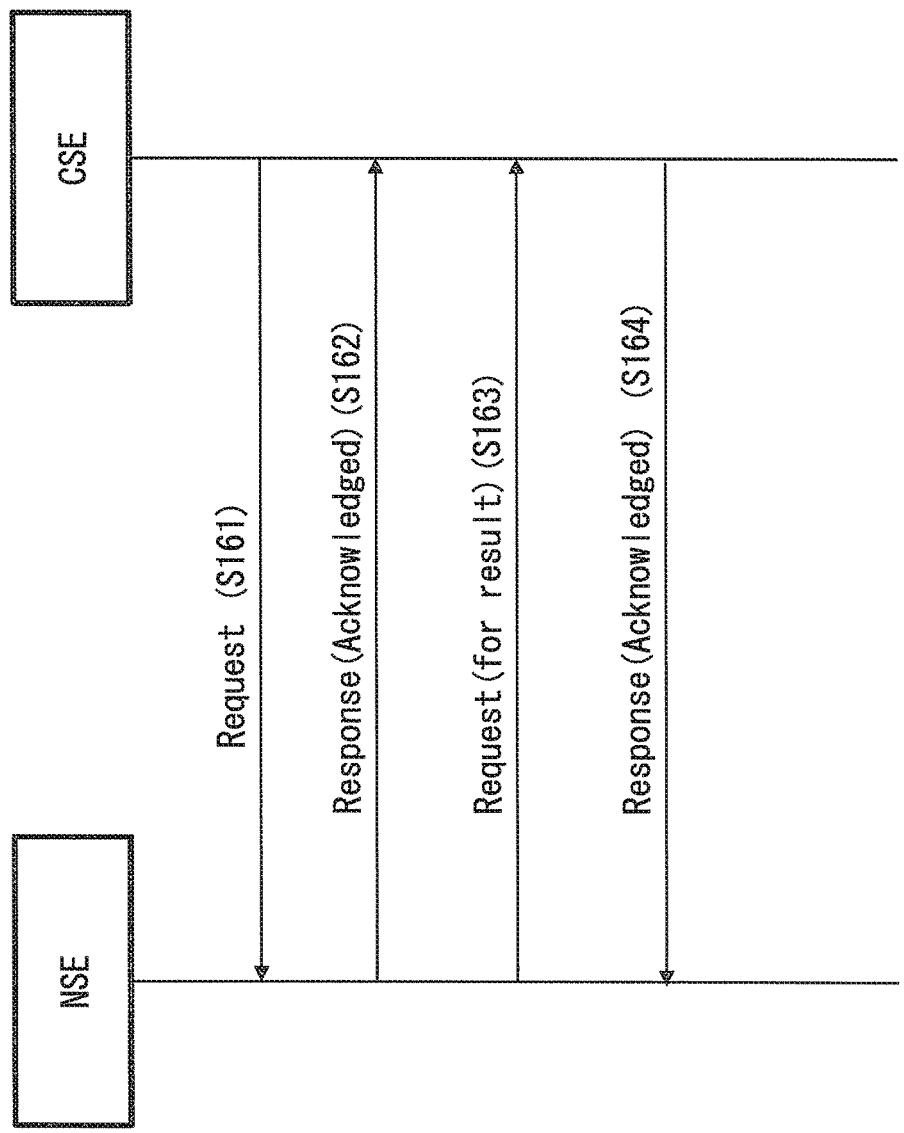
FIG. 18 is a diagram for explaining a flow of asynchronous response processing in response to a service execution request according to the second exemplary embodiment.

Next, a flow of asynchronous response processing in response to a service execution request will be described with reference to FIG. 18. First, the CSE 50 transmits a Request message to the NSE 60 (S161). Next, the NSE 60 transmits a Response message as a response message for the Request message (S162). After that, the NSE 60 transmits a Request message as a response message for the execution result of the service based on the Request message in step S161 (S163). Next, the CSE 50 transmits a Response message to the NSE 60 as a response message for the Request message in step S163 (S164).

Figure 19:
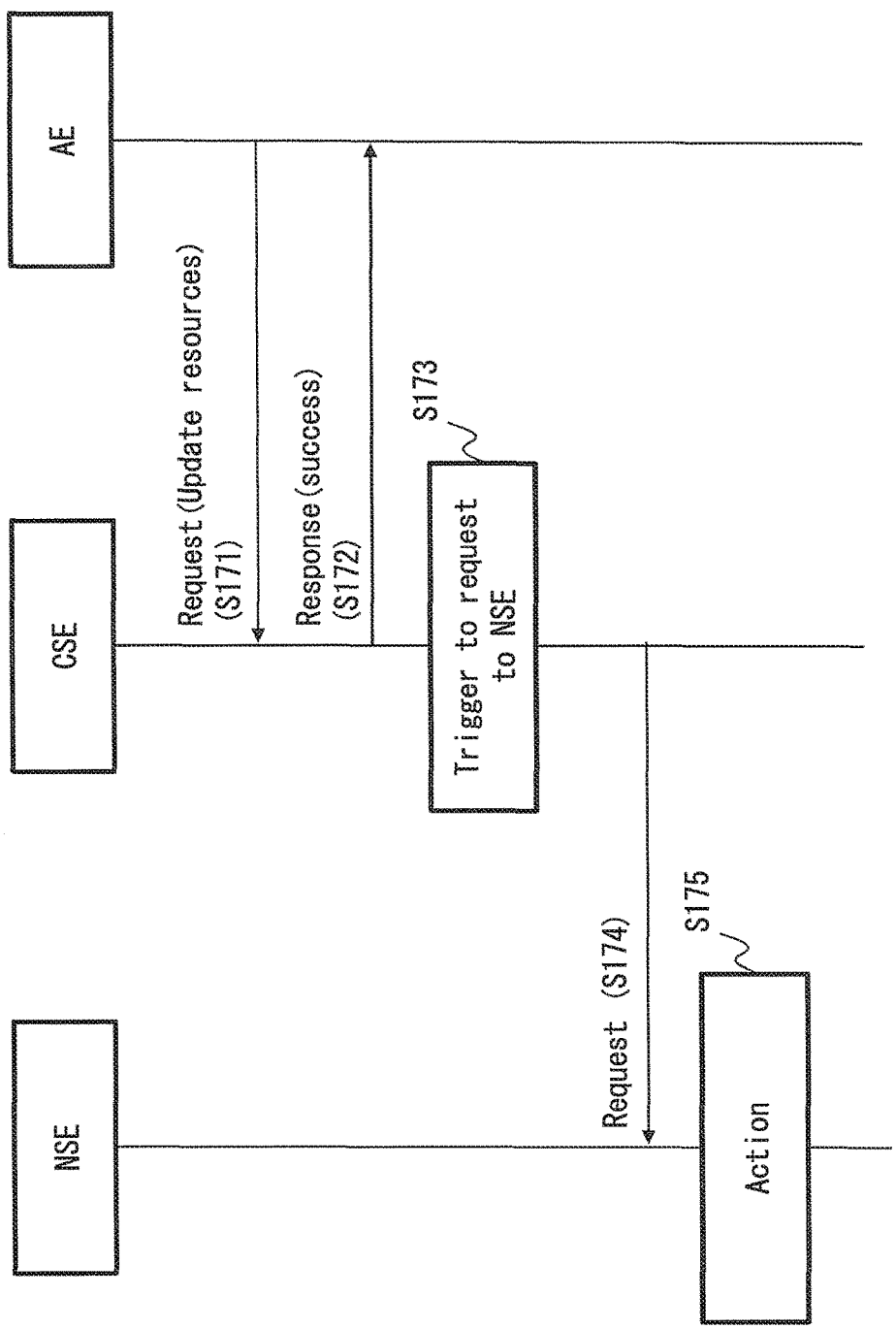
FIG. 19 is a diagram for explaining a processing flow when an AE according to the second exemplary embodiment updates resources of a CSE.

Next, a processing flow when the AE updates the resources of the CSE will be described with reference to FIG. 19. First, the AE 40 transmits a Request message to the CSE 50 to update the resources held in the CSE (S171). Examples of the resources held in the CSE include child resources included in the serviceExposure resource. Next, the CSE 50 transmits a Response message to the AE 40 as a response message (S172).

Next, when the held resources are updated, the CSE 50 determines to transmit the Request message to the NSE 60 (S173). Then, the CSE 50 transmits the Request message to the NSE 60 (S174). After that, the NSE 60 executes the indicated service based on the Request message (S175).

Figure 20:
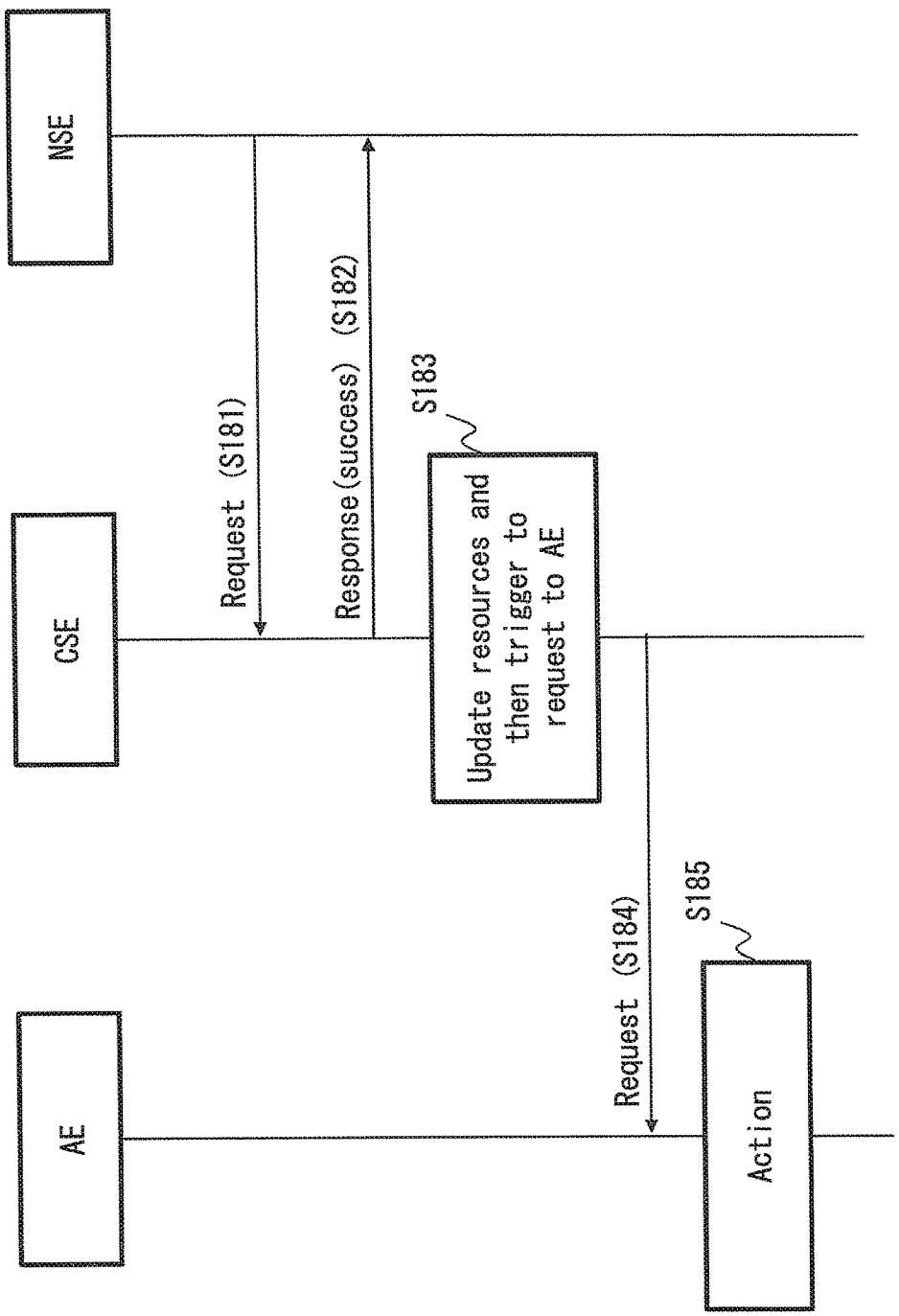
FIG. 20 is a diagram for explaining a processing flow when an NSE 60 according to the second exemplary embodiment requests a CSE 50 to update resources.

Next, a processing flow when the NSE 60 requests the CSE 50 to update resources will be described with reference to FIG. 20. First, the NSE 60 transmits a Request message to request the CSE 50 to update resources (S181). FIG. 19 illustrates the case where the AE 40 transmits the Request message to directly update the resources held in the CSE. However, in this case, the NSE 60 transmits the Request message to make a request for updating the resources in the CSE 50, instead of directly updating the resources held in the CSE 50.

Next, the CSE 50 transmits a Response message to the NSE 60 (S182). Then, the CSE 50 updates the held resources based on the Request message in step S181, and determines to transmit the Request message to the AE 40 (S183). Next, the CSE 50 transmits the Request message to the AE 40 (S184), and then the AE 40 executes the indicated service based on the Request message (S185). The processing shown in this figure is executed, for example, when the AE 40 is preliminarily configured to notify the AE of a change that has occurred in the resources of the CSE.

Figure 21:
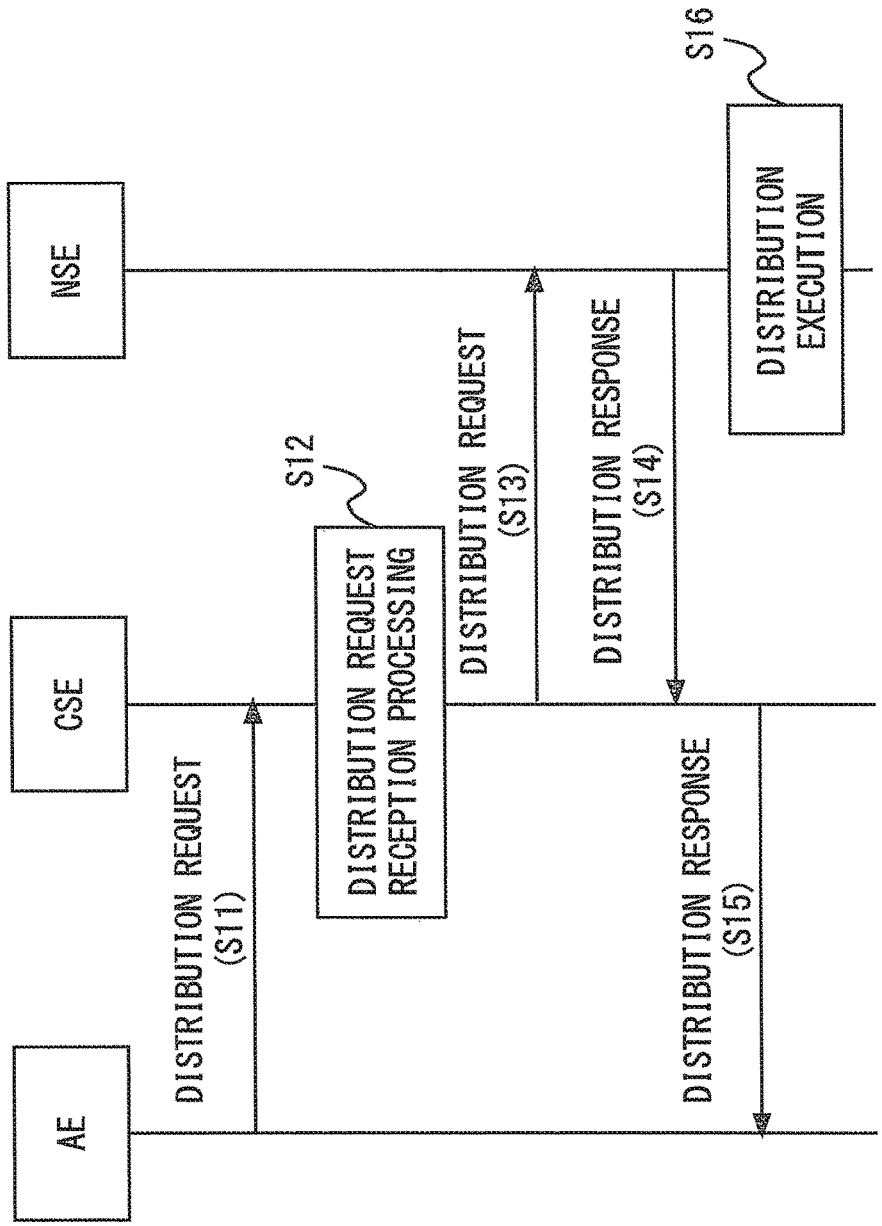
FIG. 21 is a diagram showing a distribution processing flow according to the second exemplary embodiment.

Next, a distribution processing flow according to the second exemplary embodiment of the present invention will be described with reference to FIG. 21. First, the AE 40 transmits the distribution request message to the CSE 50 (S11). The AE 40 transmits the distribution request message in which a distribution policy is set. Upon receiving the distribution request message transmitted from the AE 40, the CSE 50 executes distribution request message reception processing (S12). The distribution request message reception processing includes authentication processing for the AE 40 in the CSE 50. The distribution request message reception processing in step S12 will be described in detail later.

Next, when the CSE 50 recognizes that the AE 40 is the AE that is permitted to be connected in advance, the CSE 60 transmits the distribution request message to the NSE 60 (S13). In this case, the distribution request message transmitted from the CSE 50 to the NSE 60 may be referred to as the broadcast distribution request message.

Upon receiving the distribution request message transmitted from the CSE 50, the NSE 60 transmits the distribution response message to the CSE 50 as the response message (S14). Upon receiving the distribution response message transmitted from the NSE 60, the CSE 50 transmits the distribution response message as the response message for the distribution request message in step S11 (S15).

When the NSE 60 transmits the distribution response message in step S14, the NSE 60 executes the distribution of the information to a plurality of communication terminals (S16).

Figure 22:
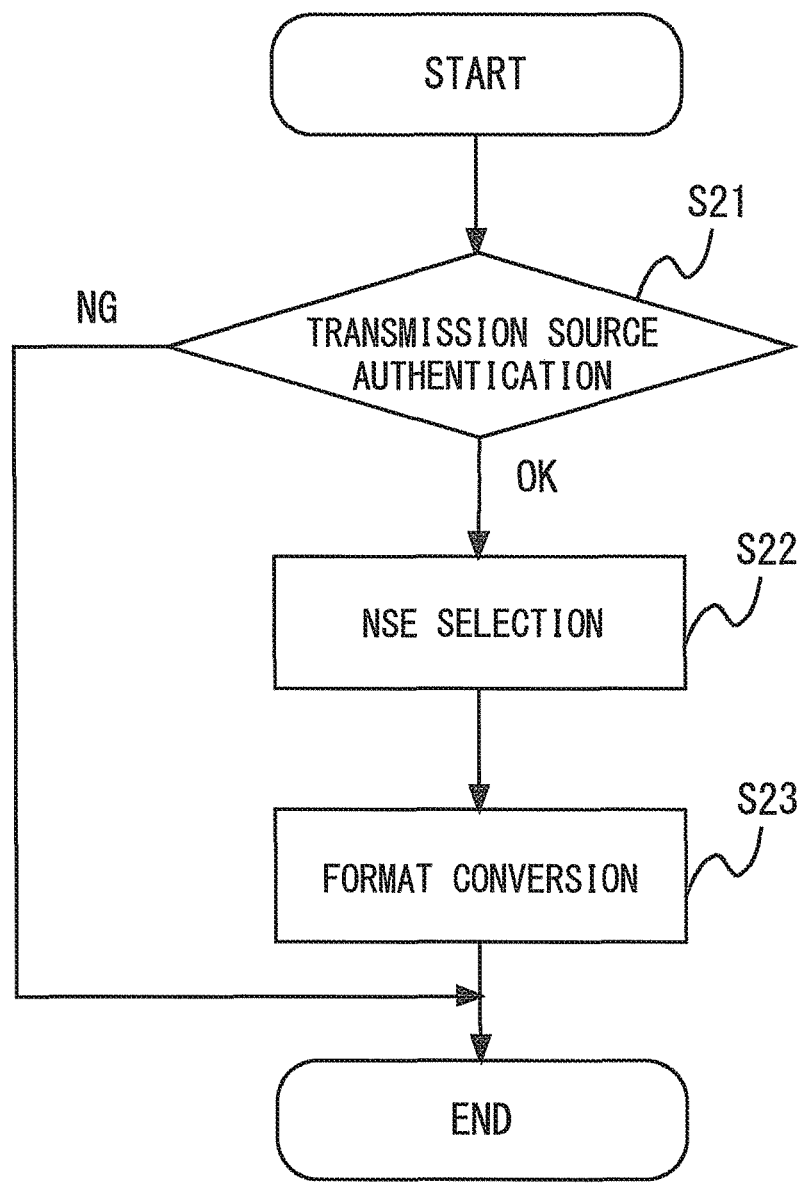
FIG. 22 is a flowchart showing a distribution request reception processing flow according to the second exemplary embodiment.

Next, a flow of the distribution request message reception processing according to the second exemplary embodiment of the present invention will be described with reference to FIG. 22. First, upon receiving the distribution request message transmitted from the AE 40, the CSE 50 performs authentication for the AE 40 which has transmitted the distribution request message (S21). Specifically, the CSE 50 determines whether the AE 40 is the AE that is permitted to be connected to the CSE 50 in advance. The CSE 50 may hold information about a list of the AEs that are permitted to be connected to the CSE 50 in advance. The CSE 50 may determine whether the AE 40 is included in the list information.

When the CSE 50 determines that the AE 40 is not included in the list information (authentication NG), the CSE 50 terminates the processing. When the CSE 50 determines that the AE 40 is included in the list information, the CSE 50 selects the NSE to which the broadcast distribution request message is to be transmitted (S22). The CSE 50 selects the NSE that can satisfy the information items designated in the distribution request message, such as the NSE capable of distributing information to the area designated in the distribution request message, or the NSE that supports the distribution system designated in the distribution request message.

Next, when the NSE 60 is selected, the CSE 50 converts the distribution request message transmitted from the AE 40 into a format to be used in the selected NSE 60. In this case, the format used in the NSE 60 is defined as the Z Reference Point. The Z Reference Point specifies a format exclusive for broadcasting and a common format in which necessary information items are defined, when the distribution request message is transmitted from the CSE 50 to the NSE 60.

As described above, the use of the communication system according to the second exemplary embodiment of the present invention enables the distribution of the distribution messages, which are transmitted from the plurality of AEs, to the communication terminals and the like via the NSE 60 in the network specified in oneM2M and the communication network using an interface. By determining the interface, such as the X Reference Point or the Z Reference Point, the information items to be communicated between the AE 40 and the CSE 50 and between the CSE 50 and the NSE 60 can be determined. This enables the CSE 50 to be easily connected to the plurality of AEs and NSEs.

Third Exemplary Embodiment

Figure 23:
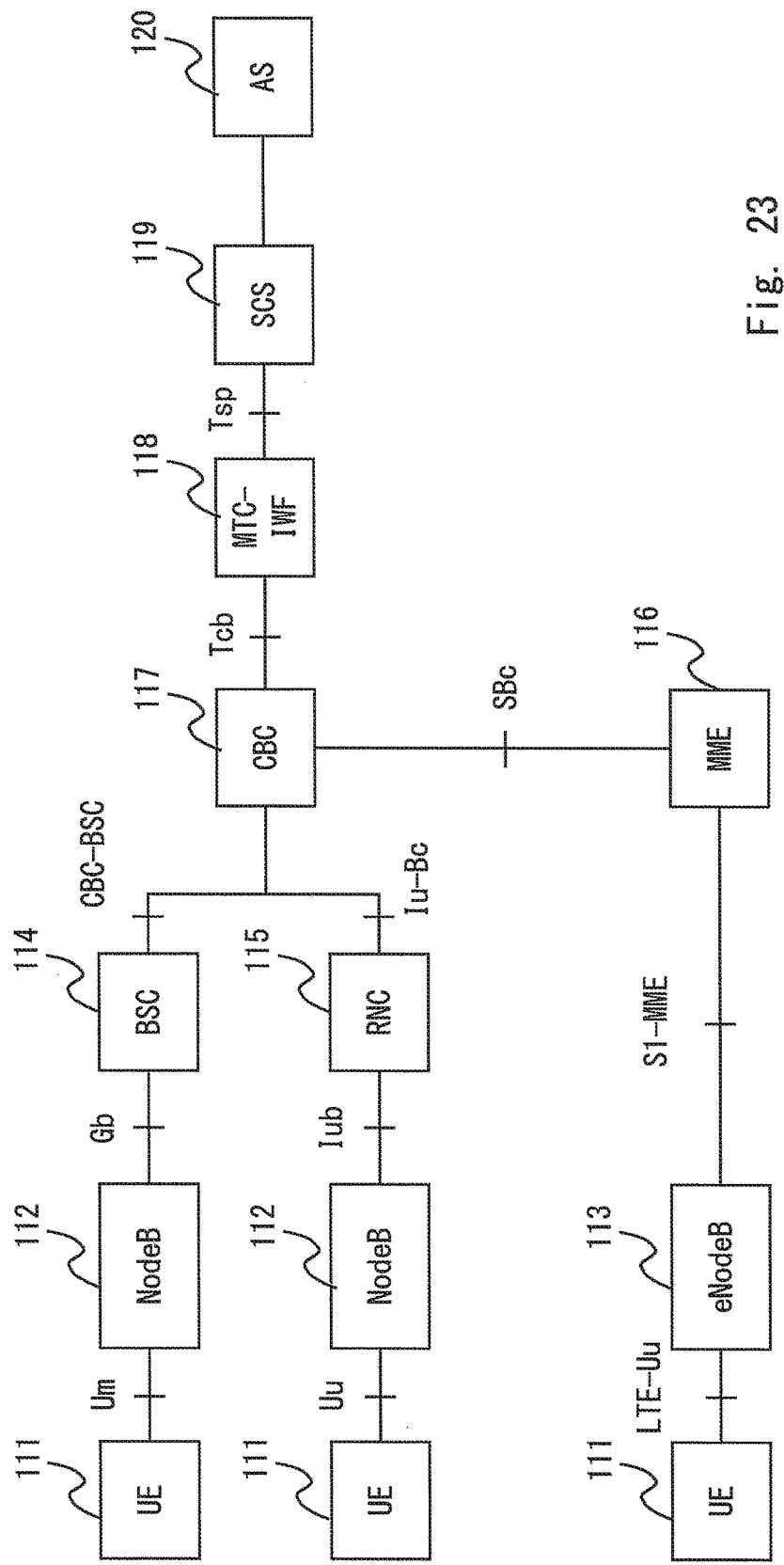
FIG. 23 is a block diagram showing a network when CBS according to a third exemplary embodiment is used.

Next, a specific network configuration when the CBS is used as the broadcast distribution system in the distribution network 30 will be described with reference to FIG. 23.

The network shown in this figure includes a UE (User Equipment) 111, a NodeB 112, an eNodeB 113, a BSC (Base Station Controller) 114, an RNC (Radio Network Controller) 115, an MME (Mobility Management Entity) 116, a CBC (Cell broadcast Center) 117, an MTC-IWF (Machine Type Communication-InterWorking Function) entity 118, an SUC (Service Capability Server) 119, and an AS 120. The UE 111, the NodeB 112, the eNodeB 113, the BSC 114, the RNC 115, the MME 116, the CBC 117, and the MTC-IWF entity 118 are node devices specified in the 3GPP.

The UE 111 corresponds to a communication terminal that receives distribution information. The NodeB 112, the eNodeB 113, the BSC 114, the RNC 115, the MME 116, the CBC 117, and the MTC-IWF entity 118 correspond to the node devices that constitute the NSE 60. The SCS 119 corresponds to the CSE 50. The AS 120 corresponds to the AE 40.

The UE 111 is a mobile communication device. The NodeB 112 and the eNodeB 113 are base station devices. More specifically, the eNodeB 113 is a base station device used in the LTE. The MME 116 mainly performs mobility management of the UE 111. The BSC 114 and the RNC 115 are devices that control the NodeB 112. The CBC 117 is a device used to execute the cell broadcast. The MTC-IWF entity 118 receives the distribution request message or the broadcast distribution request message transmitted from the SCS 119. Further, the MTC-IWF entity 118 transmits the distribution information to the CBC 117.

The symbols "Um", "Uu", "LTE-Uu", "Gb", "Iub", "CBC-BSC", "Iu-BC", "S1-MME", "SBc", "Tcb", and "Tsp" shown in this figure represent the names of interfaces between devices.

Figure 24:
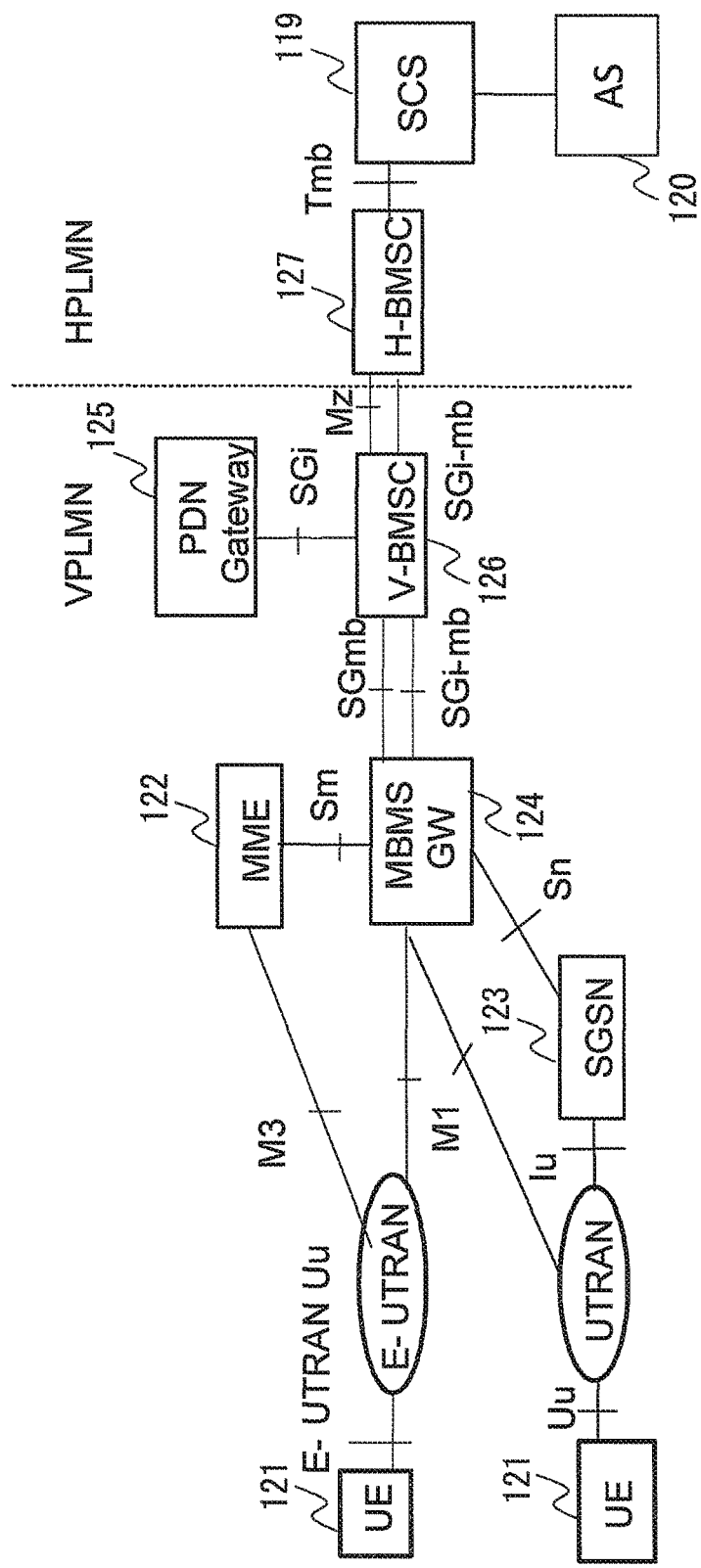
FIG. 24 is a block diagram showing a network when MBMS according to the third exemplary embodiment is used.

Next, a specific network configuration when the MBMS is used as the broadcast distribution system in the distribution network 30 will be described with reference to FIG. 24. The network shown in FIG. 24 includes a UE 121, an MME 122, an SGSN 123, an MBMS-GW 124, a PDN-GW 125, a V-BMSC (Broadcast Multicast Service Center) 126, an H-BMSC 127, the SCS 119, and the AS 120. The MBMS-GW 124 transmits data to the UE via E-UTRAN and UTRAN. The network including the UE 121, the MME 122, the SGSN 123, the MBMS-GW 124, the PDN-GW 125, the V-BMSC 126, and the H-BMSC 127 is already known as a network specified in the 3GPP, and thus the detailed description thereof is omitted.

The SCS 119 transmits the distribution request message or the broadcast distribution request message to the H-BMSC 127 based on the distribution request message transmitted through the AS 120. The BMSC is a device that stores contents to be transmitted by the MBMS. The MBMS-GW 124 transmits the distribution information, which is transmitted via the H-BMSC 127 and the V-BMSC 126, by IP multicast.

The symbols "E-UTRAN Uu", "Uu", "M3", "M1", "Iu", "Sm", "Sn", "SGmb", "SGi-mb", "SGi", "SGi-mb", "Mz", and "Tmb" shown in this figure represent the names of interfaces between devices.

As described above, the use of the information distribution system illustrated in the third exemplary embodiment of the present invention enables the CSE 50 to be connected to the distribution networks 30 that use different distribution means. The distribution networks 30 may include both of the networks illustrated in FIGS. 23 and 24, and one of the CBS and the MBMS may be used depending on the distribution system specified in the distribution request message.

Fourth Exemplary Embodiment

Figure 25:
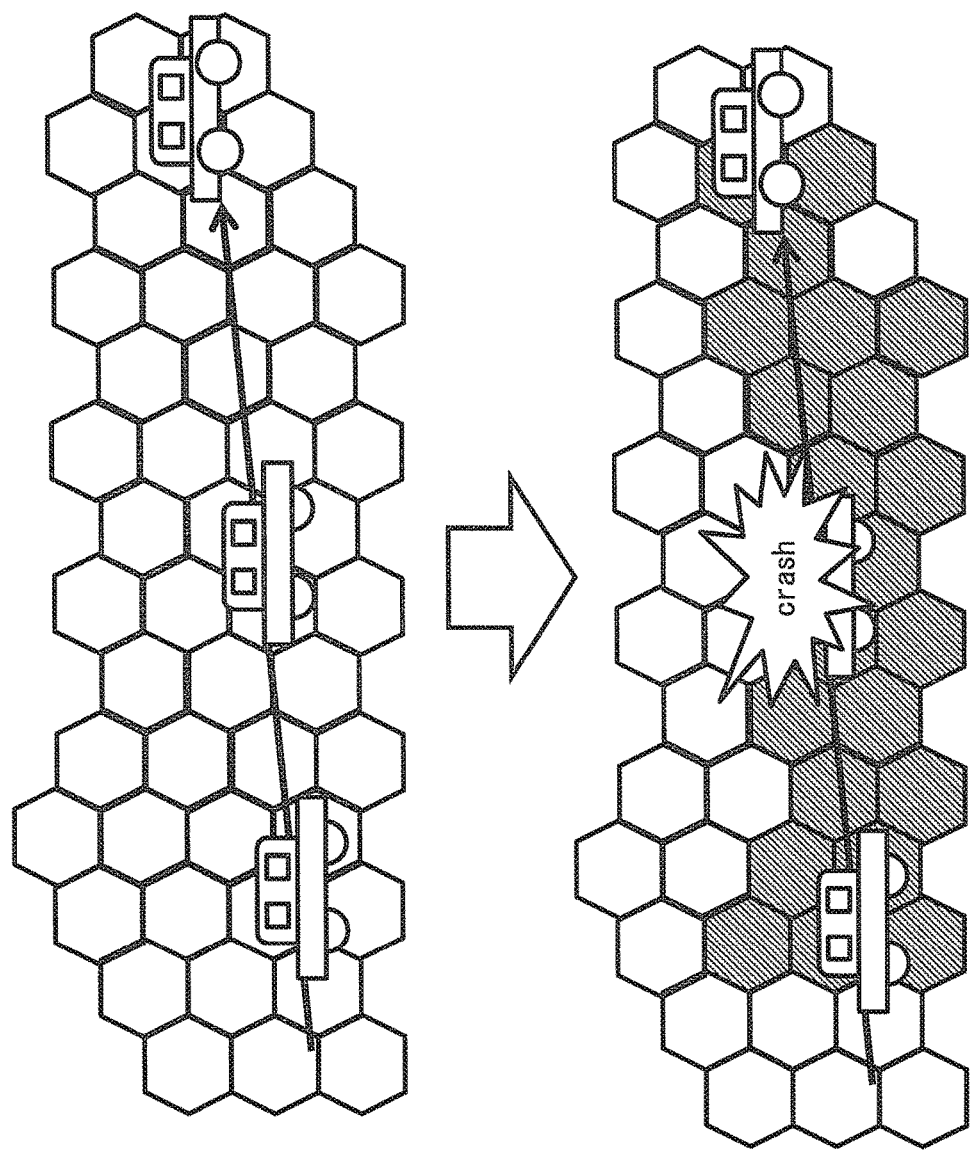
FIG. 25 is a diagram showing an outline of a broadcast service according to a fourth exemplary embodiment.

Next, an outline of broadcast services using the communication systems illustrated in the first to third exemplary embodiments of the present invention will be described with reference to FIG. 25. FIG. 25 shows a state in which a vehicle travels from the left to the right. Each hexagonal area represents an area covered by one base station, and indicates, for example, a cell or a sector.

This figure illustrates a state in which a vehicle, which is in the middle of the three vehicles, is involved in a traffic accident. In this case, for example, the AE 40 which has detected the occurrence of the traffic accident may transmit a message indicating the occurrence of the traffic accident to vehicles traveling in the vicinity of the location where the traffic accident has occurred, or may transmit a message to urge the vehicles traveling in the vicinity of the traffic accident site to slow down. Further, the AE 40 may change the contents of the messages to be distributed depending on the distribution area. For example, a message to notify about the occurrence of the traffic accident may be distributed to vehicles and the like which are located at a distance of five kilometers or more from the traffic accident site, and a message to urge vehicles to slow down may be distributed to vehicles traveling in an area within a radius of one kilometer from the traffic accident site.

For example, the AE 40 may set traffic accident information in the distribution classification, designate an area for distribution as the distribution area information, and set a message in the message body depending on the distribution area.

The AE 40 may detect the occurrence of a traffic accident based on information transmitted from a communication terminal which is owned by a person involved in the traffic accident, a person who has witnessed the traffic accident, or the like. If the vehicle which has caused a traffic accident has detected the occurrence of the traffic accident by using sensor information or the like, the traffic accident information may be autonomously sent to the AE 40. In this figure, each shaded cell represents a distribution target area.

This figure illustrates an example in which information is distributed when a traffic accident occurs. Meanwhile, if the occurrence of a traffic jam is detected, or if it is detected that a traffic jam is likely to occur, by analyzing information transmitted from a plurality of vehicles, the AE 40 may distribute traffic jam information and route guidance information to vehicles which are likely to be involved in the traffic jam.

Further, if information about traveling of an emergency vehicle, such as an ambulance, a police vehicle, or a fire-fighting vehicle, is detected, the AE 40 may distribute the information about traveling of the emergency vehicle to vehicles traveling to the destination of the emergency vehicle.

Figure 26:
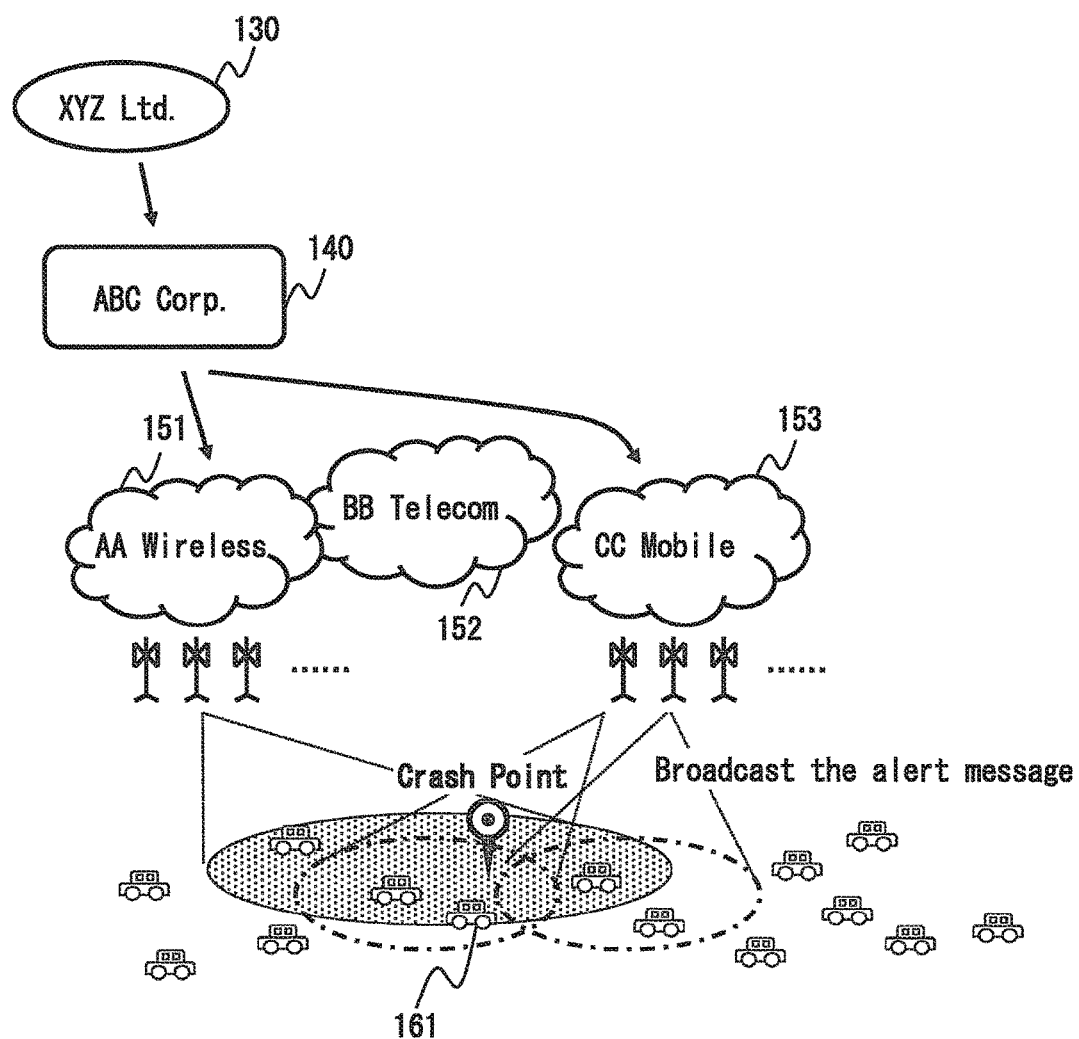
FIG. 26 is a block diagram showing a communication system according to a fourth exemplary embodiment.

An example of network selection in the CSE 50 will now be described with reference to FIG. 26. Referring to FIG. 26, an XYZ Ltd. 130 corresponds to the AE 40, and an ABC Corp. 140 corresponds to the CSE 50. An AA Wireless 151, a BB Telelcom 152, and a CC Mobile 153 indicate that there are a plurality of networks, and each of the networks corresponds to the NSE 60. A vehicle 161 including a communication device mounted thereon is shown as a specific example of the communication terminal.

As shown in FIG. 26, the ABC Corp. 140 selects the AA Wireless 151 and the CC Mobile 153 from among the AA Wireless 151, the BB Telecom 152, and the CC Mobile 153. The AA Wireless 151 and the CC Mobile 153 use a base station device or the like in the respective networks and transmit the distribution message to the vehicle 161 within the area managed by a base station FIG. 26 illustrates that the CSE 50 can select one or more networks. For example, if one selected NSE 60 is not enough to distribute information to the entire area designated by the AE 40, the CSE 50 may select a plurality of networks. Alternatively, the CSE 50 may change the network to be selected depending on the distribution time.

As described above, the communication systems illustrated in the first to third exemplary embodiments can be used to implement specific services. Further, since the CSE 50 can select a plurality of networks, the distribution policy specified by the AE 40 can be achieved more accurately.

Note that the present invention is not limited to the above exemplary embodiments, and can be modified as appropriate without departing from the scope of the invention.

Although the present invention is described as a hardware configuration in the above exemplary embodiments, the present invention is not limited to this. According to the present invention, any processing can be implemented by causing a CPU (Central Processing Unit) to execute a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

While the present invention has been described above with reference to exemplary embodiments, the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2013-202774, filed on Sep. 27, 2013, the disclosure of which is incorporated herein in its entirety by reference.

REFERENCE SIGNS LIST

10 APPLICATION SERVER
20 COMMON SERVICE DEVICE
21 AUTHENTICATION UNIT
22 COMMUNICATION UNIT
30 DISTRIBUTION NETWORK
31 DISTRIBUTION DEVICE
32 COMMUNICATION UNIT
40 AE
50 CSE
55 CSFs
60 NSE
111 UE
112 NodeB
113 eNodeB
114 BSC
115 RNC
116 MME
117 CBC
118 MTC-IWF ENTITY
119 SCS
120 AS

The invention claimed is:

1. A common service device that is located in a service platform connected to a plurality of distribution networks and aggregates a plurality of application servers, the common service device comprising:
   at least one memory storing instructions, and
   at least one processor configured to execute the instructions to:
      perform authentication for a first application server by using a distribution request message transmitted from the first application server via a first interface commonly set among the plurality of application servers, the first application server being included in the plurality of application servers, the first interface specifying a format exclusive for broadcasting and a common format in which a distribution destination service platform ID and a distribution source application ID are defined, when the distribution request message is transmitted from the first application server to the common service device; and
      select a first distribution network for which broadcast distribution is requested from among the plurality of distribution networks based on the distribution request message, and for transmitting a broadcast distribution request message to the selected first distribution network.

2. The common service device according to claim 1, wherein the at least one processor of the common service device is further configured to execute the instructions to convert the distribution request message into a signal format to be used in the first distribution network.

3. The common service device according to claim 1, wherein
   the distribution request message includes a distribution source application identifier to identify the first application server, and
   the at least one processor of the common service device is further configured to execute the instructions to perform authentication for the first application server by using the distribution source application identifier.

4. The common service device according to claim 1, wherein the at least one processor of the common service device is further configured to execute the instructions to select the first distribution network that satisfies a distribution policy included in the distribution request message.

5. The common service device according to claim 4, wherein the distribution policy defines at least one of a distribution type, distribution area information, and a distribution period.

6. The common service device according to claim 1, wherein the at least one processor of the common service device is further configured to execute the instructions to transmit the broadcast distribution request message to the first application server via a second interface commonly set among the plurality of distribution networks.

7. The common service device according to claim 1, wherein the at least one processor of the common service device is further configured to execute the instructions to determine a content of a charge on the first application server based on the distribution request message.

8. A distribution device that is located in a distribution network, the distribution device comprising:
  at least one memory storing instructions; and
  at least one processor configured to execute the instructions to:
    acquire a broadcast distribution request message generated based on a distribution request message from a common service device that has received the distribution request message transmitted from an application server, the distribution request message transmitted via a first interface commonly set among a plurality of application servers from the application server to the common service device and the first interface specifying a format exclusive for broadcasting and a common format in which a distribution destination service platform ID and a distribution source application ID are defined, when the distribution request message is transmitted from the application server to the common service device and distribute information to a plurality of communication terminals based on a distribution policy included in the broadcast distribution request message.

9. A communication system comprising:
  a common service device that aggregates a plurality of application servers; and
  a distribution device connected to the common service device, wherein
  the common service device is located in a service platform,
  the common service device includes:
    at least one memory storing instructions; and
    at least one processor configured to execute the instructions to;
      perform authentication for a first application server by using a distribution request message transmitted from the first application server via a first interface commonly set among the plurality of application servers, the first application server being included in the plurality of application servers and the first interface specifying a format exclusive for broadcasting and a common format in which a distribution destination service platform ID and a distribution source application ID are defined, when the distribution request message is transmitted from the first application server to the common service device; and
      select a first distribution network for which broadcast distribution is requested from among a plurality of distribution networks based on the distribution request message, and transmit a broadcast distribution request message to the selected first distribution network,
  the distribution device is located in the first distribution network, and
  the distribution device includes:
    at least one memory storing instructions, and
    at least one processor configured to execute the instructions to:
      acquire the broadcast distribution request message and distributing information to a plurality of communication terminals based on a distribution policy included in the broadcast distribution request message.

10. A distribution method for a common service device that is located in a service platform connected to a plurality of distribution networks and aggregates a plurality of application servers, the distribution method comprising:
  executing authentication processing for a first application server by using a distribution request message transmitted from the first application server via a first interface commonly set among the plurality of application servers, the first application server being included in the plurality of application servers and the first interface specifying a format exclusive for broadcasting and a common format in which a distribution destination service platform ID and a distribution source application ID are defined, when the distribution request message is transmitted from the first application server to the common service device;
  selecting a first distribution network for which broadcast distribution is requested from among the plurality of distribution networks based on the distribution request message; and
  transmitting a broadcast distribution request message to the selected first distribution network.

11. The distribution method according to claim 10, wherein after the first distribution network is selected, the distribution request message is converted into a signal format to be used in the first distribution network.

12. The distribution method according to claim 10, wherein
  the distribution request message includes a distribution source application identifier to identify the first application server, and
  during the execution of the authentication processing, authentication for the first application server is performed using the distribution source application identifier.

13. The distribution method according to claim 10, wherein during the selection of the first distribution network, the first distribution network that satisfies a distribution policy included in the distribution request message is selected.

14. The distribution method according to claim 10, wherein during the transmission of the broadcast distribution request message, the broadcast distribution request message is transmitted to the first application server via a second interface commonly set among the plurality of distribution networks.

15. A non-transitory computer readable medium storing a program for causing a computer of a common service device to execute processing, the common service device being located in a service platform connected to a plurality of distribution networks and being configured to aggregate a plurality of application servers, the processing comprising the steps of:

executing authentication processing for a first application server by using a distribution request message transmitted from the first application server via a first interface commonly set among the plurality of application servers, the first application server being included in the plurality of application servers and the first interface specifying a format exclusive for broadcasting and a common format in which a distribution destination service platform ID and a distribution source application ID are defined, when the distribution request message is transmitted from the first application server to the common service device;

selecting a first distribution network for which broadcast distribution is requested from among the plurality of distribution networks based on the distribution request message; and transmitting a broadcast distribution request message to the selected first distribution network.

* * * * *